(12) United States Patent
Lakshminarayana et al.

(10) Patent No.: US 11,816,779 B2
(45) Date of Patent: Nov. 14, 2023

(54) RENDERING TEXTURED SURFACE USING SURFACE-RENDERING NEURAL NETWORKS

(71) Applicants: Adobe Inc., San Jose, CA (US); The Regents of the University of California, Oakland, CA (US)

(72) Inventors: Krishna Bhargava Mullia Lakshminarayana, San Francisco, CA (US); Zexiang Xu, San Jose, CA (US); Milos Hasan, San Jose, CA (US); Ravi Ramamoorthi, Carlsbad, CA (US); Alexandr Kuznetsov, San Diego, CA (US)

(73) Assignees: Adobe Inc., San Jose, CA (US); The Regents of the University of California, Oakland, CA (US)

(*) Notice: Subject to any disclaimer, the term of this patent is extended or adjusted under 35 U.S.C. 154(b) by 0 days.

(21) Appl. No.: 17/538,311

(22) Filed: Nov. 30, 2021

(65) Prior Publication Data
US 2023/0169715 A1    Jun. 1, 2023

(51) Int. Cl.
G06T 15/04     (2011.01)
G06T 15/55     (2011.01)
G06N 3/045     (2023.01)

(52) U.S. Cl.
CPC ............. *G06T 15/04* (2013.01); *G06N 3/045* (2023.01); *G06T 15/55* (2013.01)

(58) Field of Classification Search
CPC .......... G06T 15/04; G06T 15/55; G06N 3/045
See application file for complete search history.

(56) References Cited

U.S. PATENT DOCUMENTS

2019/0043242 A1* 2/2019 Risser ................ G06T 15/04
2019/0236830 A1* 8/2019 Akenine-Moller ..... G06T 15/04

OTHER PUBLICATIONS

Dana et al., Reflectance and Texture of Real-World Surfaces, ACM Transactions on Graphics, vol. 18, No. 1, Jan. 1999, pp. 1-34.
Dupuy et al., Linear Efficient Antialiased Displacement and Reflectance Mapping, ACM Transactions on Graphics, vol. 32, No. 6, Nov. 2013, pp. 211:1-121:11.

(Continued)

*Primary Examiner* — King Y Poon
*Assistant Examiner* — Vincent Peren
(74) *Attorney, Agent, or Firm* — Kilpatrick Townsend & Stockton LLP

(57) ABSTRACT

Methods and systems disclosed herein relate generally to surface-rendering neural networks to represent and render a variety of material appearances (e.g., textured surfaces) at different scales. The system includes receiving image metadata for a texel that includes position, incoming and outgoing radiance direction, and a kernel size. The system applies a offset-prediction neural network to the query to identify an offset coordinate for the texel. The system inputs the offset coordinate to a data structure to determine a feature vector for the texel of the textured surface. The reflectance feature vector is then processed using a decoder neural network to estimate a light-reflectance value of the texel, at which the light-reflectance value is used to render the texel of the textured surface.

20 Claims, 14 Drawing Sheets
(8 of 14 Drawing Sheet(s) Filed in Color)

(56) References Cited

OTHER PUBLICATIONS

Filip et al., Bidirectional Texture Function Modeling: A State of the Art Survey, IEEE Transactions on Pattern Analysis and Machine Intelligence, vol. 31, No. 11, Nov. 2009, pp. 1921-1940.
Han et al., Frequency Domain Normal Map Filtering, ACM Transactions on Graphics, vol. 26, No. 3, Jul. 2007, pp. 28-1-28-11.
Jakob et al., Discrete Stochastic Microfacet Models, ACM Transactions on Graphics, vol. 33, No. 4, Jul. 2014, 10 pages.
Jakob, Mitsuba2: Physically Based Renderer, Available Online at: http://www.mitsuba-renderer.org/, Accessed from Internet on Dec. 1, 2021, 1 page.
Kaneko et al., Detailed Shape Representation with Parallax Mapping, In Proceedings of the ICAT, Dec. 5-7, 2001, 4 pages.
Kaplanyan et al., Filtering Distributions of Normals for Shading Antialiasing, Proceedings of High Performance Graphics, Jun. 2016, 12 pages.
Koudelka et al., Acquisition, Compression, and Synthesis of Bidirectional Texture Functions, In 3rd International Workshop on Texture Analysis and Synthesis, Jan. 2003, 5 pages.
Kuznetsov et al., Learning Generative Models for Rendering Specular Microgeometry, ACM Transactions on Graphics, vol. 38, No. 6, Nov. 2019, pp. 225:1-225:14.
Maximov et al., Deep Appearance Maps, Proceedings of the IEEE/CVF International Conference on Computer Vision, Oct. 29, 2019, 10 pages.
Mildenhall et al., NeRF: Representing Scenes as Neural Radiance Fields for View Synthesis, European Conference on Computer Vision, Aug. 3, 2020, pp. 1-25.
Muller et al., Compression and Real-Time Rendering of Measured BTFs Using Local PCA, Proceedings of the Vision, Modeling, and Visualization Conference, Nov. 2003, pp. 1-9.
Muller et al., Neural Control Variates, ACM Transactions on Graphics, vol. 39, No. 6, Dec. 2020, pp. 243:1-243:19.
Muller et al., Neural Importance Sampling, ACM Transactions on Graphics, vol. 38, No. 5, Oct. 2019, pp. 145:1-145:19.
Nalbach et al., Deep Shading: Convolutional Neural Networks for Screen-Space Shading, Eurographics Symposium on Rendering, vol. 36, No. 4, Jul. 2017, 14 pages.
Olano et al., Lean Mapping, In Proceedings of the 2010 ACM SIGGRAPH symposium on Interactive 3D Graphics and Games, Feb. 19-21, 2010, pp. 181-188.
Oliveira et al., An Efficient Representation for Surface Details, UFRGS Technical Report, Jan. 26, 2005, 9 pages.
Pharr et al., PBRT V3, Available Online at: https://github.com/mmp/pbrt-v3/, Accessed from Internet on Dec. 1, 2021, pp. 1-4.
Rainer et al., Neural BTF Compression and Interpolation, Computer Graphics Forum, vol. 38, No. 2, May 2019, 10 pages.
Rainer et al., Unified Neural Encoding of BTFs, Computer Graphics Forum (Proceedings of Eurographics), vol. 39, No. 2, May 2020, pp. 167-178.
Rematas et al., Deep Reflectance Maps, Proceedings of the IEEE Conference on Computer Vision and Pattern Recognition, Jun. 27-30, 2016, pp. 4508-4516.
Thies et al., Deferred Neural Rendering: Image Synthesis Using Neural Textures, ACM Transactions on Graphics, vol. 38, No. 4, Apr. 28, 2019, 12 pages.
Wang et al., Capturing and Rendering Geometry Details for BTF-Mapped Surfaces, The Visual Computer, vol. 21, No. 8, Sep. 2005, pp. 1-9.
Weinmann et al., Material Classification Based on Training Data Synthesized Using a BTF Database, European Conference on Computer Vision, vol. 8691, Sep. 2014, pp. 156-171.
Williams, Pyramidal Parametrics, Siggraph, ACM, vol. 17, No. 3, Jul. 1983, pp. 1-11.
Wu et al., Accurate Appearance Preserving Prefiltering for Rendering Displacement-Mapped Surfaces, ACM Transactions on Graphics, vol. 38, No. 4, Jul. 2019, pp. 137:1-137:14.
Yan et al., A BSSRDF Model for Efficient Rendering of Fur with Global Illumination, ACM Transactions on Graphics, vol. 36, No. 6, Nov. 2017, pp. 208:1-208:13.
Zhao et al., Downsampling Scattering Parameters for Rendering Anisotropic Media, ACM Transactions on Graphics, vol. 35, No. 6, Nov. 2016, pp. 166:1-166:11.
"Mitsuba 3", Mitsuba Renderer, Available Online at: http://www.mitsuba-renderer.org., 2010, 1 page.
"Principal Curvature", Available Online at: https://en.wikipedia.org/wiki/Principal_curvature, Accessed from Internet on Jun. 12, 2023, 3 pages.
"Substance Source Library", Available Online at: https://source.substance3d.com, Accessed from Internet on Jun. 12, 2023, 8 pages.
Baatz et al., "NeRF-Tex: Neural Reflectance Field Textures", Eurographics Symposium on Rendering—DL-Only Track, Adrien Bousseau and Morgan McGuire (Eds.), vol. 40, No. 4, Jun. 22, 2021, pp. 1-13.
Dufort et al., "Interactive Rendering of Meso-Structure Surface Details using Semi-Transparent 3D Textures", In Proceeding of Vision, Modeling and Visualization, Nov. 16-18, 2005, 9 pages.
Fan et al., "Neural BRDFs: Representation and Operations", ACM Transactions on Graphics, vol. 1, No. 1, Nov. 2021, 13 pages.
Jacobson et al., "libigl—A simple C++ Geometry Processing Library", Available Online at: https://libigl.github.io/, Accessed from Internet on Jun. 12, 2023, 7 pages.
Kuznetsov et al., "NeuMIP: Multi-Resolution Neural Materials", ACM Transactions on Graphics, vol. 40, No. 4, Article 175, Aug. 2021, pp. 1-13.
Kuznetsov et al., "Rendering Neural Materials on Curved Surfaces", In Special Interest Group on Computer Graphics and Interactive Techniques Conference Proceedings, Aug. 7-11, 2022, 9 pages.
Oliveira, "Relief Texture Mapping", In Proceedings of the 27th Annual Conference on Computer Graphics and Interactive Techniques, 2000, 10 pages.
Policarpo et al., "Real-Time Relief Mapping on Arbitrary Polygonal Surfaces", Proceedings of the 2005 Symposium on Interactive 3D Graphics and Games, Apr. 2005, pp. 155-162.
Porumbescu et al., "Shell Maps", ACM Transactions on Graphics, vol. 24, No. 3, Jul. 2005, 8 pages.
Szirmay-Kalos et al., "Displacement Mapping on the GPU—State of the Art", Computer Graphics Forum, vol. 25, No. 3, 2006, pp. 1-24.
Thonat et al., "Tessellation-Free Displacement Mapping for Ray Tracing", ACM Transactions on Graphics, vol. 40, No. 6, Article 282, Dec. 14, 2021, 2 pages.
Wang et al., "Generalized Displacement Maps", The Eurographics Association, 2004, 8 pages.
Wang et al., "View-Dependent Displacement Mapping", ACM Transactions on Graphics (TOG), vol. 22, No. 2, 2003, pp. 334-339.
Zhao et al., "Building Volumetric Appearance Models of Fabric Using Micro CT Imaging", ACM Transactions on Graphics vol. 30 Issue 4 Article No. 44, 2014 Abstract pp. 1-4.

* cited by examiner

RENDERING TEXTURED SURFACE USING SURFACE-RENDERING NEURAL NETWORKS

FIELD

This disclosure generally relates to rendering textured surfaces having complex patterns. More specifically, but not by way of limitation, this disclosure relates to using surface-rendering neural networks for rendering textured surfaces across various image scales.

BACKGROUND

The world is full of materials with interesting small-scale structure: a green pasture consisting of millions of individual blades of grass; a scratched and partially rusted metallic paint on a car; a knitted sweater; or a velvet dress. Rendering the underlying intermediate structures and microstructure of these materials can greatly vary based on their respective complex surface height profiles, fibers and yarns, self-shadowing, multiple reflections and refractions, and subsurface scattering. Rendering many of these effects can also vary at different levels of detail. For example, individual fibers of a fabric can be seen when the material is zoomed-in, but the fibers morph into yarns and eventually disappear as the material is being zoomed-out.

SUMMARY

Certain embodiments include a system and method for using surface-rendering neural networks to represent and render various textured surfaces at different scales. A surface-rendering application receives image metadata for a texel that includes position, incoming and outgoing radiance directions, and a kernel size. The surface-rendering application applies a offset-prediction neural network to the query to identify an offset coordinate for the texel. The surface-rendering application inputs the offset coordinate to a neural-texture pyramid to determine a reflectance feature vector for the texel of the textured surface. The reflectance feature vector is then processed using a decoder neural network to estimate a light-reflectance value of the texel, at which the surface-rendering application uses the light-reflectance value to render the texel of the textured surface.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Features, embodiments, and advantages of the present disclosure are better understood when the following Detailed Description is read with reference to the accompanying drawings.

DETAILED DESCRIPTION

Figure 1:
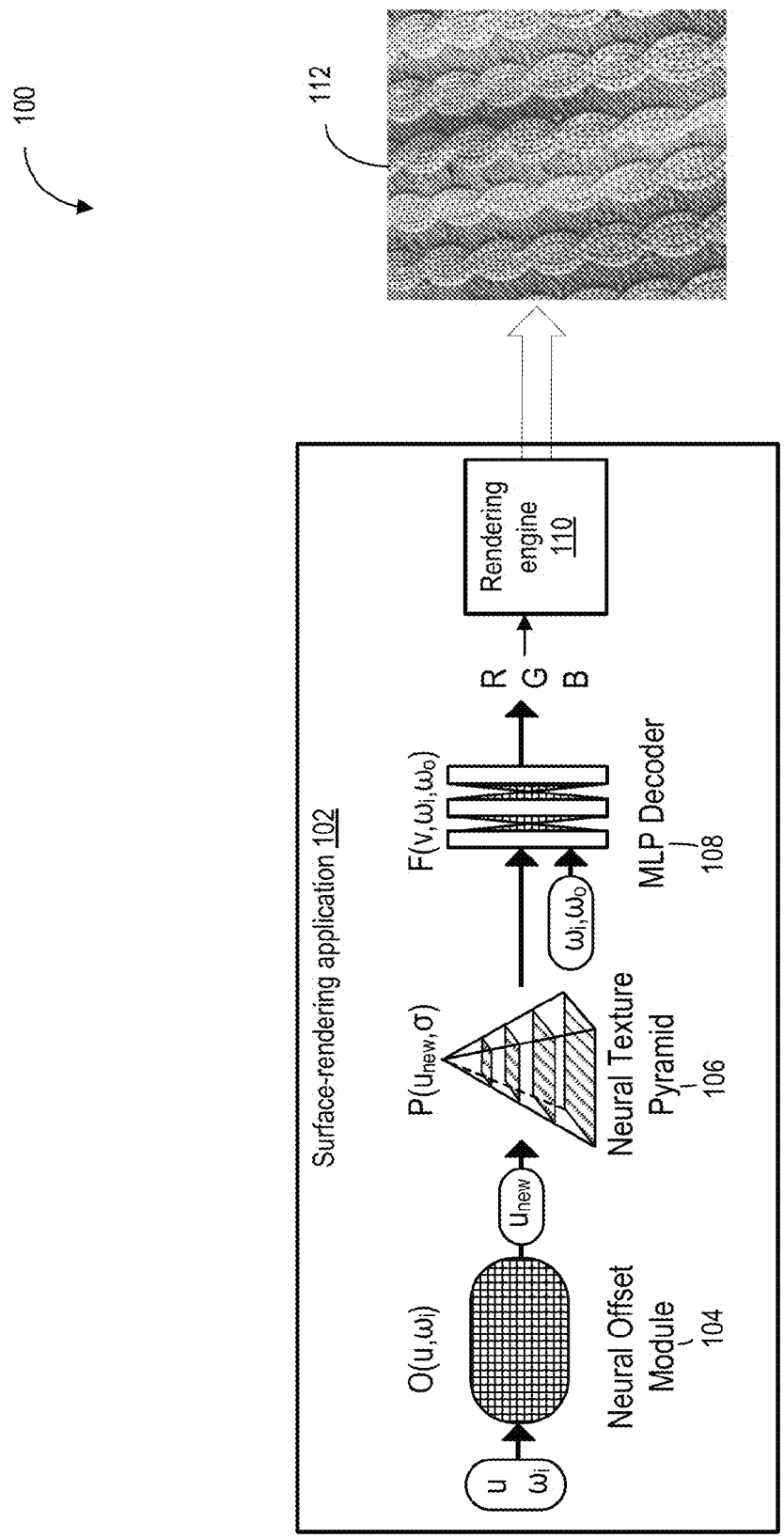
FIG. 1 illustrates an example environment for using surface-rendering neural networks to render textured surfaces, according to some embodiments.

While there are conventional techniques for rendering textured surfaces that depict these materials, such conventional techniques require large computational expense and/or result in loss of generality. For example, a conventional technique includes designing for a specific material at a particular level of detail then using the design to render textured surfaces across various scales. However, such designing is difficult for a material that covers a large patch, because the process becomes either slow or inaccurate (e.g., artifacts, loss of details). Conventional prefiltering techniques may decrease computational cost for rendering textured surfaces, but fail to perform adequately when rendering complex materials that need to take into account self-shadowing, fibers, and/or more complex microstructures and reflectances. Thus, it is challenging to accurately render textured surfaces with complex patterns at various scales, while decreasing the computational cost and processing time.

Certain embodiments described herein can address one or more of the problems identified above by using surface-rendering neural networks that are configured to increase efficiency and improving image quality of textured surfaces. The surface-rendering neural networks include three network components: (i) an offset-prediction neural network; (ii) a neural-texture pyramid; and (iii) a decoder neural network. These network components are trained such that surfaces with complex patterns can be accurately rendered, while significantly reducing the processing time. Details for each network component is discussed below.

A surface-rendering application receives image metadata for rendering a texel of a textured surface. The textured surface can be rendered over an image object having a particular texture, a material, and/or a pattern. In an illustrative example, the surface-rendering application receives image metadata for rendering an orange-colored knitted fabric over an image object depicted in a graphical user interface. The image metadata include, for a texel of the target surface, a coordinate identifying a location of the texel within the target surface, an incoming radiance direction, an outgoing radiance direction, and a kernel size. In this current example, the incoming and outgoing radiance directions can be used to determine how the current texel of the knitted fabric would appear under different lighting and camera conditions. The kernel size indicates an amount of detail the textured-surface rendering (e.g., a pixel footprint) shows under a current zoom level (e.g., 120%), image resolution (e.g., 256×256), or image scale (e.g., 5×) of the image object. In some instances, the kernel size is computed from pixel coverage of the textured surface. Referring back to this current example, the kernel size for the texel of the knitted fabric is 6×6 texel.

The surface-rendering application applies an offset-prediction neural network to the coordinate and the incoming radiance direction to predict an offset coordinate of the texel. The offset-prediction neural network is used to facilitate the rendering of the texel to take into account various factors such as shadows created when light is reflected on a particular angle of an uneven surface. In this current example, the location of the texel is at a mid-point of 45-degree angle surface of the knitted fabric. Further, the incoming radiance direction is from the same 45-degree angle of the surface. The offset-prediction neural network can be applied to such location and the incoming radiance direction to determine an offset coordinate, such that the texel is rendered with an orange color that includes additional shadow relative to another texel that is located on a flat surface.

The surface-rendering application then queries a neural-texture pyramid using the offset coordinate as input to determine a reflectance feature vector of the texel at the kernel size. The neural-texture pyramid includes a set of neural textures. The kernel size specified in the image metadata is used to determine which neural texture of the set of neural textures (of a specific image resolution level) of the neural-texture pyramid is selected. Each neural texture of the set of neural textures includes a set of reflectance feature vectors, and a neural texture is selected to provide reflectance feature vectors at the kernel size specified in the image metadata. Each reflectance feature vector of the set of reflectance feature vectors also includes one or more latent variables that encode visual characteristics of a respective texel. The visual characteristics can include self-shadowing, inter-reflections, displacements, fibers or other structure associated with the textured surface.

In this current example, the surface-rendering application queries the neural-texture pyramid using the offset coordinate of the knitted-fabric texel. The surface-rendering application identifies a location within a neural texture that corresponds to the offset coordinate, in which the neural texture is selected based on the kernel size indicated in the image metadata. For instance, the surface-rendering application uses the offset coordinate to identify corresponding locations on two adjacent 8×8 and 4×4 texel queries, then performs trilinear interpolation to obtain the location at 6×6 texels. The surface-rendering application then selects a reflectance feature vector at the location. The reflectance feature vector includes latent variables that encode visual characteristics of the texel.

The surface-rendering application estimates a light-reflectance value for the texel by applying a decoder neural network to the reflectance feature vector, the incoming radiance direction, and the outgoing radiance direction. As indicated above, the incoming radiance direction and the outgoing radiance direction are specified in the image metadata. The term "light-reflectance value" is referred to as a metric that identifies an amount of visible and usable light that reflects from a part of the textured surface that is represented by a texel. For example, the light-reflectance value is a metric that identifies a percentage of light a color of the texel reflects. The light-reflectance value can be represented by RGB color values.

In this current example, the surface-rendering application estimates the light-reflectance value of the knitted-fabric texel by applying the decoder neural network to its reflectance feature vector. The light-reflectance value of the knitted-fabric pixel can identify a particular shade of orange color that takes into account the amount of light being reflected onto the textured surface.

The surface-rendering application renders, based on the light-reflectance value, the texel of the textured surface at the location. In some instances, the texel depicts at least part of the textured surface at an image scale that corresponds to the kernel size. In this current example, the surface-rendering application renders a dark orange color of the texel based on its light-reflectance value. Such process can be repeated for other texels of the textured surface to render the detailed and complex patterns of the knitted fabric.

Certain embodiments described herein provide improved techniques for accurately rendering textured surfaces with complex patterns. To increase accuracy of rendering textures with complex patterns, the present techniques use the offset-prediction neural networks that predict offsets for texels that are located on uneven portions of the textured surface. Based on these offsets, the rendered textured surfaces can show detailed material patterns. Moreover, the offset-prediction neural networks are trained using an unsupervised training algorithm and without requiring the use of explicit height-field as training data. In effect, the processing time and cost for training the offset-prediction neural network can be significantly reduced.

Further, as compared to using conventional mipmapping techniques that store actual image data at various image resolutions, the neural-texture pyramid can significantly decrease storage. In particular, the neural-texture pyramid stores reflectance feature vectors across multiple texture channels, in which the reflectance feature vectors have a substantially smaller storage footprint than the image data. The use of neural-texture pyramid thus decreases the amount of computer resources needed for rendering textured surfaces. In the same vein, the reflectance feature vectors are precomputed during training, thereby eliminating the need of an encoder. Thus, the use of neural-texture pyramids can significantly reduce computational cost in rendering textured surfaces. As demonstrated in the example section below, the surface-rendering neural networks can render textured surfaces with substantially less errors than conventional techniques, while reducing the processing time and using approximately one-tenth of neural network parameters.

A. OVERALL ENVIRONMENT

A surface-rendering application receives image metadata for a texel that includes position, incoming and outgoing radiance directions, and a kernel size. The surface-rendering application applies a offset-prediction neural network to the query to identify an offset coordinate for the texel. The surface-rendering application inputs the offset coordinate to a neural-texture pyramid to determine a reflectance feature vector for the texel of the textured surface. The reflectance feature vector is then processed using a decoder neural network to estimate a light-reflectance value of the texel, at which the surface-rendering application uses the light-reflectance value to render the texel of the textured surface.

1. Example Implementation

FIG. 1 illustrates an example environment for using surface-rendering neural networks to render textured surfaces, according to some embodiments. A surface-rendering application 102 receives image metadata for rendering a texel of a textured surface. The textured surface may depict an image object having a particular texture (e.g., uneven surface, cliff rocks), a material (e.g., leather, basket weave) and/or a pattern (e.g., checkered pattern, twisted pattern). The image metadata can be multi-dimensional data structure (e.g., 7-dimensional query) that includes a coordinate identifying a location of the texel within the textured surface, an incoming radiance direction, an outgoing radiance direction, and a kernel size. The kernel size indicates an amount of detail the textured-surface rendering (e.g., a pixel footprint) shows under a current zoom level (e.g., 120%), image resolution (e.g., 256×256), or image scale (e.g., 5×) of the image object. In some instances, the kernel size is computed from pixel coverage of the textured surface.

A neural offset module 104 of the surface-rendering application 102 receives, for a texel, a uv-space location of and incoming radiance direction. The neural offset module 104 applies an offset-prediction neural network (not shown) to the uv-space location and incoming radiance direction to predict a new offset uv-space location denoted as $u_{new}$. The offset location allows the texel to be rendered to show complex texture patterns that involve shadows and bumpy surfaces. In addition, the offset is generated to simulate parallax effects as the textured surface is zoomed-in or zoomed-out by a user.

A neural-texture query module 106 of the surface-rendering application 102 then inputs the offset $u_{new}$ to query (e.g., via trilinear interpolation) a neural texture pyramid to determine a reflectance feature vector of the texel. The neural-texture pyramid is a data structure that shares a similar structure as a mipmap, but the neural-texture pyramid includes a set of neural textures instead of encoded image data. The kernel size (e.g., 6×6 texels) is used to determine which neural texture of the set of neural textures (of a specific image resolution level) of the neural-texture pyramid is selected. Each neural texture of the set of neural textures includes a set of reflectance feature vectors, which allows a neural texture to be selected in accordance with the kernel size specified by the image metadata. Each reflectance feature vector of the set of reflectance feature vectors also includes one or more latent variables that encode visual characteristics of a respective texel. The visual characteristics can include self-shadowing, inter-reflections, displacements, fibers or other structure associated with the textured surface. In some instances, values of these latent variables are learned using supervised training (e.g., backpropagation).

A decoder 108 of the surface-rendering application 102 then applies a decoder neural network to the reflectance feature vector, incoming radiance direction, and outgoing radiance directions to estimate a light-reflectance value of the texel. The decoder neural network 108 can be a multi-layer perceptron network that is trained to decode the reflectance feature vector to estimate the light-reflectance value of the texel. In some instances, the light-reflectance value is expressed as a set of RGB-color values. The light-reflectance value of the texel can then be used by a rendering engine 110 to generate a portion of an output image 112. The above process can be repeated for other texels until the output image 112 is rendered. As shown in FIG. 1, the output image 112 accurately renders complex fiber patterns of a twisted wool fabric.

Figure 2:
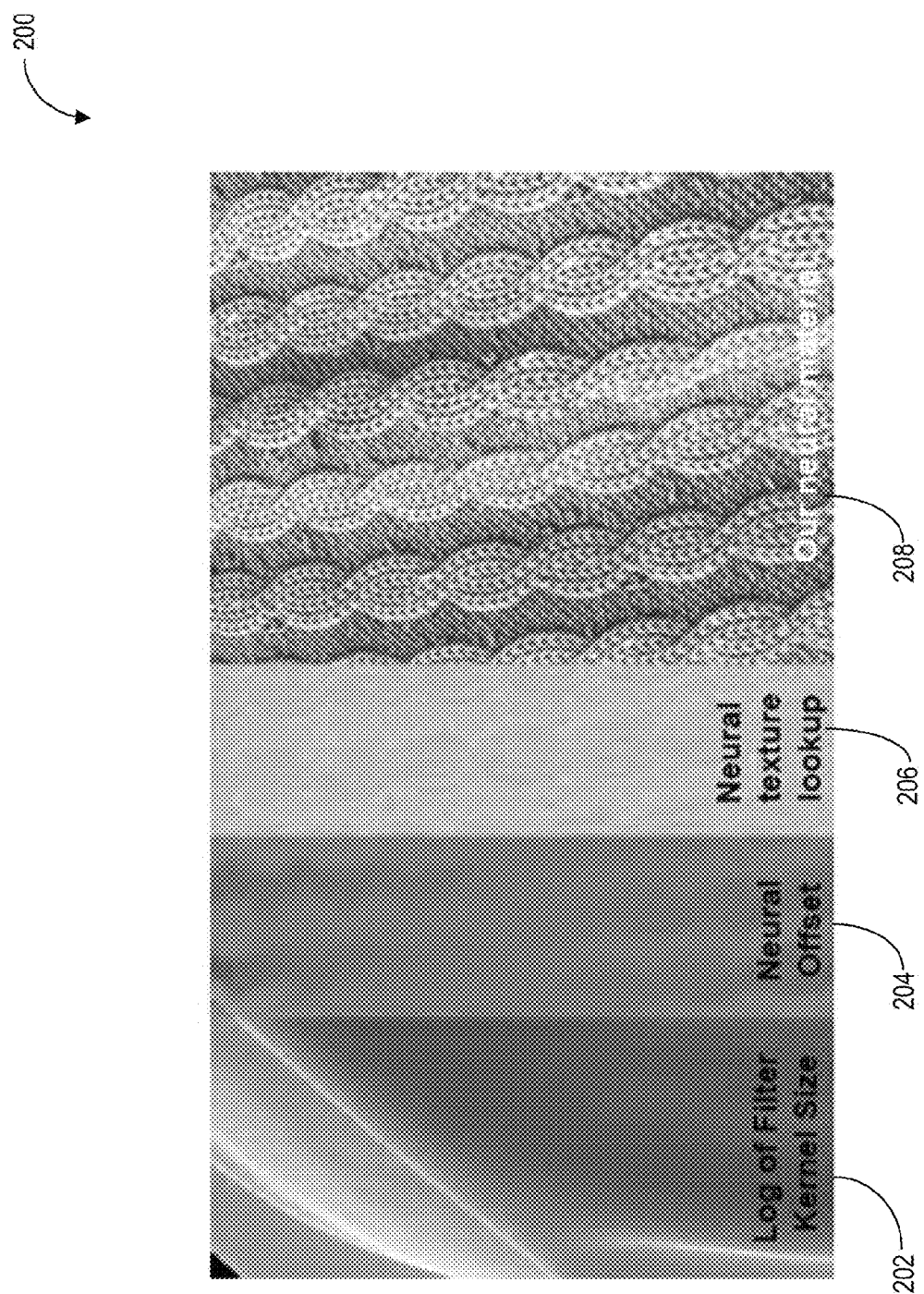
FIG. 2 shows an example set of images that illustrate a process for using surface-rendering neural networks to render textured surfaces, according to some embodiments.

FIG. 2 shows an example set of images that illustrate a process for using surface-rendering neural networks to render textured surfaces, according to some embodiments. The example set of images 202 show the following stages of the rendering process performed by the surface-rendering application: (i) computing a kernel size 202 based on pixel coverage; (ii) applying a neural offset module to determine offset locations 204 having parallax effects; (iii) inputting the offset locations to a neural texture pyramid to obtain reflectance feature vectors 206; and (iv) applying a fully-connected neural network to obtain a light-reflectance value usable in a standard renderer. The process 200 thus generates a multi-resolution neural material 208 representing twisted wool fabric, which can be rendered seamlessly among standard materials using Monte Carlo path tracing. The surface-rendering neural networks are trained using hundreds of reflectance queries per texel, across multiple resolutions, and is independent of the underlying input, which could be based on displaced geometry (in this example), fiber geometry, measured data, or others.

2. Process for Rendering Textured Surfaces Using Reflectance Feature Vectors

Figure 3:
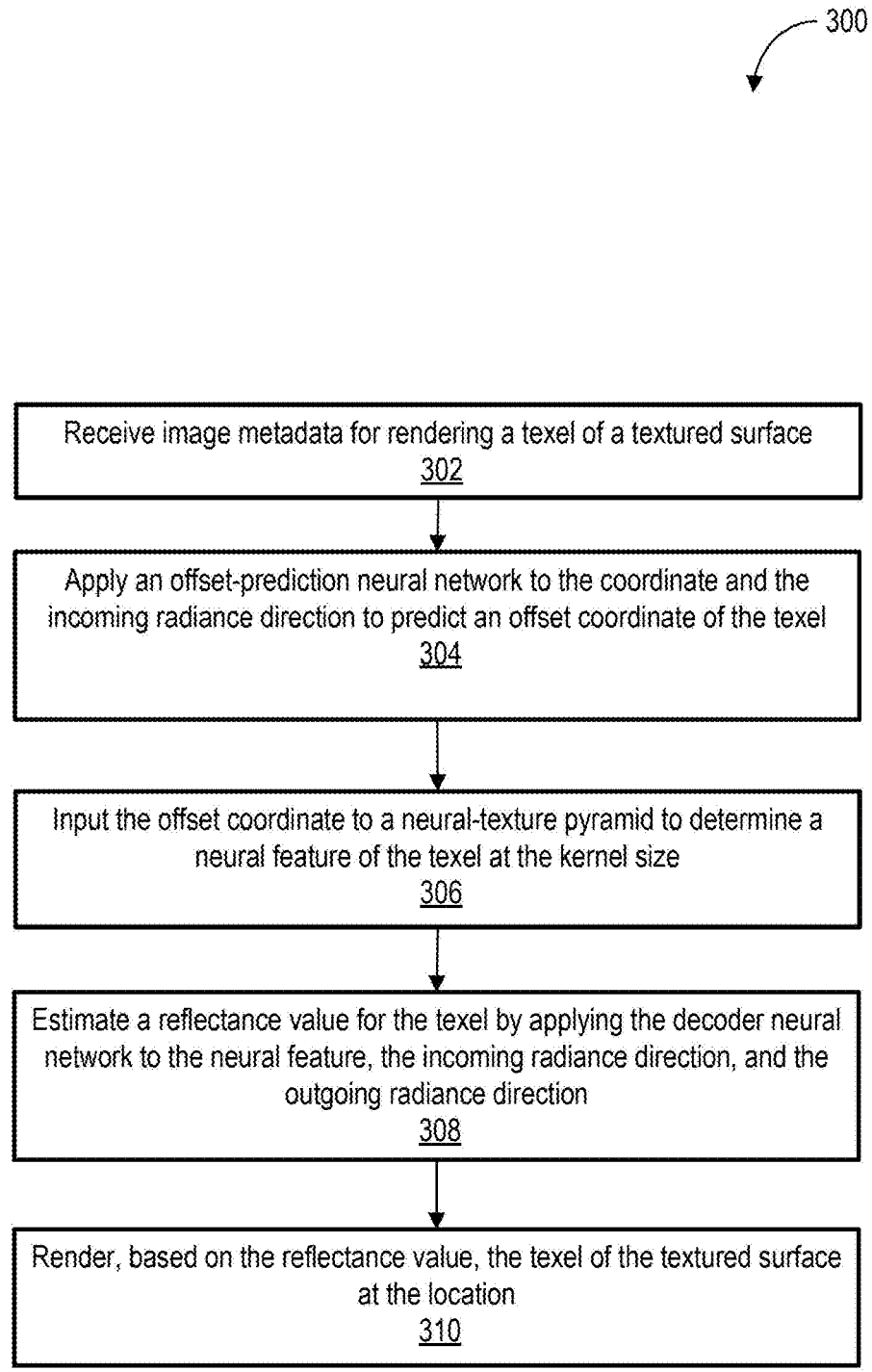
FIG. 3 shows a process for using surface-rendering neural networks to render textured surfaces, according to some embodiments.

FIG. 3 shows a process for using surface-rendering neural networks to render textured surfaces, according to some embodiments. For illustrative purposes, the process 300 is described with reference to the components illustrated in FIG. 1, though other implementations are possible. For example, the program code for a surface-rendering application 102 of FIG. 1, which is stored in a non-transitory computer-readable medium, is executed by one or more processing devices to cause a server system to perform one or more operations described herein.

At step 302, the surface-rendering application receives image metadata for rendering a texel of a textured surface. The textured surface can be rendered over an image object having a particular texture, a material, and/or a pattern. The image metadata can be multi-dimensional data structure (e.g., 7-dimensional query) that includes a coordinate identifying a location of the texel within the textured surface, an incoming radiance direction, an outgoing radiance direction, and a kernel size. In some instances, the kernel size is computed from pixel coverage of the textured surface.

At step 304, the surface-rendering application applies an offset-prediction neural network to the coordinate and the incoming radiance direction to predict an offset coordinate of the texel. In particular, the surface-rendering application queries a neural-offset texture using the coordinate to identify an offset feature vector of the coordinate. The offset feature vector can be determined by performing bilinear interpolation of the coordinate onto the neural-offset texture. The surface-rendering application applies the offset-prediction neural network (e.g., a multi-layer perceptron network) to the offset feature vector and the incoming radiance direction to estimate a ray depth associated with the coordinate. In some instances, the offset-prediction neural network is trained using an unsupervised training algorithm. The surface-rendering application then applies an offset function to the ray depth to predict the offset coordinate of the texel.

At step 306, the surface-rendering application inputs the offset coordinate to a neural-texture pyramid to determine a reflectance feature vector of the texel at the kernel size. The neural-texture pyramid includes a set of neural textures. The kernel size is used to determine which neural texture of the set of neural textures (of a specific image resolution level) of the neural-texture pyramid is selected. Each neural texture of the set of neural textures includes a set of reflectance feature vectors, and a neural texture is selected to provide reflectance feature vectors in accordance with the kernel size specified in the image metadata. Each reflectance feature vector of the set of reflectance feature vectors also includes one or more latent variables that encode visual characteristics of a respective texel. The visual characteristics can include self-shadowing, inter-reflections, displacements, fibers or other structure associated with the textured surface.

To determine the reflectance feature vector, the surface-rendering application queries the neural-texture pyramid by identifying, from a first neural texture of the set of neural textures, a first location within the first neural texture based on bilinear interpolation of the offset coordinate. In some instances, the first neural texture is a neural texture that corresponds to the highest image resolution (e.g., 512×512 image resolution). The surface-rendering application then selects a second neural texture of the set of neural textures based on the kernel size. If the kernel size specified in the image metadata matches that of the first neural texture, the reflectance feature vector identified from the first location can be used to represent the texel. If the kernel size does not match that of the first neural texture, the surface-rendering application interpolates the first location of the first neural texture to a second location of the second neural texture. The surface-rendering application then selects a reflectance feature vector at the second location as the reflectance feature vector that represents the texel.

At step 308, the surface-rendering application estimates a light-reflectance value for the texel by applying the decoder neural network to the reflectance feature vector, the incoming radiance direction, and the outgoing radiance direction. As indicated above, the incoming radiance direction and the outgoing radiance direction are specified in the image metadata. Based on this configuration, the decoder neural network can be trained separately from the offset-prediction neural network and the neural-texture pyramid, as the offset-prediction neural network and the neural-texture pyramid are independent from the radiance direction. Additionally or alternatively, all three networks are trained together, at which their respective parameters are adjusted using a backpropagation algorithm.

At step 310, the surface-rendering application renders, based on the light-reflectance value, the texel of the textured surface at the location. In some instances, the texel depicts at least part of the textured surface at an image scale that corresponds to the kernel size. For example, if the kernel size indicates 6×6 texels, the surface-rendering application renders the texel to depict content of the textured surface at an image scale that matches the kernel size. Process 300 terminates thereafter.

B. OVERVIEW

As discussed above, conventional techniques are performed at the cost of large computational expense and/or loss of generality. Conventional techniques typically require designing a material that covers a large patch becomes either slow or inaccurate (e.g., presence of artifacts). For example, when zoom-out occurs, integration over a given image patch is achieved. Theoretically, this can be achieved using Monte Carlo integration techniques by evaluating a large number of samples of the patch. However, the variance of such estimator grows with the size of the patch, and the integration techniques result in requiring a large effort to compute a function that typically becomes simpler under zoomed-out viewing conditions. Traditional mipmapping techniques can be used, but could erroneously average parameters such as surface normals that influence the non-linearly appearance of the material. Thus, efficient and accurate rendering of complex materials across different scales (i.e., finding the integral of the patch of material microstructure covered by a pixel) has been challenging.

In addition, there have been attempts on using neural networks to efficiently compress bidirectional texture functions (BTFs). However, these attempts do not support pre-filtering with arbitrary kernel sizes, thereby resulting in inefficiency in generating the textured surface at a particular scale. These attempts can be performed for mostly flat materials, and their image quality degrades substantially for materials that include complex fiber patterns (for example). These attempts includes training an encoder for compressing the BTF. Accordingly, conventional neural network-based techniques do not effectively address the above challenges.

The present techniques address the above challenges by using surface-rendering neural networks to accurately represent a variety of complex materials across different scales. The surface-rendering neural networks can be trained using synthetic and real image data. The surface-rendering neural networks output light-reflectance values that can be integrated into a standard path-tracing system for rendering the textured surface.

To determine the light-reflectance values for the textured surface, the present techniques include using a modified version of mipmapping referred herein as neural-texture pyramid. The neural-texture pyramid uses a set of learned power-of-2 feature textures (e.g., 512×512) to represent the material at different scales. The neural-texture pyramid can be queried to identify the input vector (e.g., a reflectance feature vector) for a particular texel.

The reflectance feature vector is then inputted into a per-material decoder (e.g., a multi-layer perceptron neural network). In particular, the decoder receives as input a trilinearly-interpolated reflectance feature vector queried from the neural-texture pyramid, along with incoming and outgoing radiance directions. The decoder then outputs light-reflectance values that can be used to render textured surfaces. Thus, neural-texture pyramid and the decoder can be trained to learn parameters that can collectively be expressed as a continuous variant of a BTF (referred herein as "multi-scale BTF" or "MBTF"). The MBTF can be a 7-dimensional function, with two dimensions each for the query location, incoming and outgoing radiance direction, and one extra dimension for the filter kernel size. This framework can represent a complex material (with self-shadowing, inter-reflections, displacements, fibers or other structure) that can be smoothly transitioned across different scales.

Additionally or alternatively, the present techniques can also accurately and efficiently represent materials with non-flat geometric features by using offset-prediction neural networks. In some instances, a offset-prediction neural network is used to render textured surfaces with intricate parallax effects and without any tessellation. Parameters of the offset-prediction neural network can be learned using unsupervised training and without requiring the use of explicit heightfield as training data. The learned neural offset allows the rendering of intricate geometry without any tessellation. The appearance of a non-flat material is thus obtained without the cost of constructing, storing, and intersecting the displaced geometry of the material.

Because the present techniques can represent a wide variety of materials using the same architecture, adding support for a new material becomes a matter of creating a dataset of random material queries and optimizing the feature textures and network weights. This typically takes only about 45 minutes on a single GPU for 512×512 resolution of the bottom pyramid level, which is substantially more efficient than explicitly generating or acquiring a full high-resolution BTF. Further, as opposed to an explicit BTF, the neural-texture pyramid only requires storage on the order of traditional mipmapped texture pyramids (with 7 channels per texel), while enabling efficient prefiltering and multiscale appearance. Finally, the present techniques includes an encoder-less architecture, thus not requiring an encoder much less training such encoder using high-resolution BTF slices as training data. Rather, the present techniques can accurately render textured surfaces based on a neural network trained with a small batch of training data (e.g., about 200-400 random BTF queries per texel)

C. TECHNIQUES FOR RENDERING TEXTURED SURFACE USING SURFACE-RENDERING NEURAL NETWORKS

In some embodiments, reflectance feature vectors of a textured surface are determined based on a query that identifies location on the textured surface, incoming radiance direction, outgoing radiance direction, and kernel size. The reflectance feature vectors are then used to determine light-reflectance values, and the light-reflectance values are used to render the textured surface. The reflectance feature vector is determined based on querying a neural-texture pyramid using offset coordinates of the texel. The neural-texture pyramid is supplemented with an offset-prediction neural network, which can be used to identify offset coordinates that account for complex material patterns (e.g., objects in a terrain, fibers in clothes).

1. Multi-resolution BTF

Accurately computing the reflected radiance on a material surface with complex microgeometry—usually modeled by displaced geometry, fibers, volumetric scattering, etc.—is computationally expensive and requires tracing complex geometry at a microscopic scale. To σ, increase efficiency in rendering these types of textured surfaces, a surface-rendering application precomputes the reflectance of the material for a given location u, radius of the footprint kernel a, incoming radiance direction $\omega_i$, and outgoing radiance direction $\omega_o$. For reference, Table 1 provides the following definitions for each symbol notation:

TABLE 1

| Symbol | Domain | Definition |
| --- | --- | --- |
| $\mathcal{H}$ | | Hemisphere |
| $\omega_i$ | $\mathcal{H}$ | Incoming radiance direction |
| $\omega_o$ | $\mathcal{H}$ | Outgoing radiance direction |

TABLE 1-continued

| Symbol | Domain | Definition |
| --- | --- | --- |
| u | $\mathbb{R}^2$ | Surface position |
| σ | $\mathbb{R}^+$ | Radius of query kernel |
| l | $\mathbb{R}$ | Level of detail (log. of σ) |
| s | $\mathbb{R}$ | Discrete level of detail |
| v | $\mathbb{R}^c$ | Reflectance Feature vector |
| ψ | $\mathbb{R}^{c2}$ | Feature v. tor neural offset |
| $C_1, C_2$ | $\mathbb{R}$ | Feature vec. channel num. |
| $T_S$ | $\mathbb{R}^2 \to \mathbb{R}^c$ | Neural texture lookup |
| M | $\mathbb{R}^2, \mathbb{R}^+, \mathcal{H}, \mathcal{H} \to$ RGB | Multiscale BTF |
| P | $\mathbb{R}^2, \mathbb{R}^+ \to \mathbb{R}^c$ | Neural Texture Pyramid |
| F | $\mathbb{R}^n, \mathcal{H}, \mathcal{H} \to$ RGB | Fully connected module |
| O | $\mathbb{R}^2, \mathcal{H} \to \mathbb{R}^2$ | Neural offset module |
| $T_{off}$ | $\mathbb{R}^2 \to \mathbb{R}^{c2}$ | Neural offset texture |
| $F_{off}$ | $\mathbb{R}^n, \mathcal{H} \to \mathbb{R}$ | Neural offset MLP |
| H | $\mathcal{H}, \mathbb{R} \to \mathbb{R}^2$ | Ray depth to offset |

The MBTF is represented as M that includes inputs u, σ, $\omega_i$, and $\omega_o$. Below the MBTF is defined as follows:

$$M(\mu, \sigma, \omega_i, \omega_o) = \int_{R^2} G(u, \sigma; x) B(x, \omega_i, \omega_o) dx \quad (1)$$

where: (1) $G(\mu, \omega, x)$ is a normalized 2 D Gaussian with mean μ and standard deviation ω, as a function of x; and (2) $B(u, \omega_1, \omega_o)$ can be seen as a traditional BTF at the finest material level.

The MBTF value can be a weighted average over the Gaussian kernel centered at u of the exitant radiance in direction $\omega_0$, assuming the material is lit by distant light of unit irradiance from direction $\omega_i$.

Parameters of the MBTF can be captured from real data. In some instances, Monte Carlo path tracing is used to define the MBTF using synthetic microstructure modeled on a reference plane. The value $B(u, \omega_1, \omega_o)$ is computed by tracing a standard path estimator from direction—$\omega_o$ towards u, assuming lighting from a distant light from direction $\omega_i$ with unit irradiance onto the reference plane. A distant light is used with a finite smoothing kernel in directions, to improve convergence of the path tracer and make multiple importance sampling applicable.

The MBTF generalizes the standard radiometric definition of a bidirectional reflectance distribution function (BRDF), which is defined as outgoing radiance per unit incoming irradiance. Therefore, if the synthetic microstructure includes of a simple plane with a homogeneous BRDF, the BTF and MBTF will be equal to that BRDF for any position and kernel size. It is also noted that the BTF and MBTF generally are not reciprocal due to occlusions and multiple light bounces.

2. Baseline Architecture of the Surface-Rendering Neural Networks

However, a 7-dimensional MBTF is too prohibitive to store directly. To address this problem, redundancies of the MBTF function are captured using a neural network architecture. In particular, a baseline neural architecture is proposed that can generate a model for rendering many complex materials. In particular, the baseline architecture includes: (i) a neural-texture pyramid P that encodes complex spatially-varying material appearance across different image scales; and (ii) a decoder neural network F that computes directional reflectance from the pyramid. The light-reflectance value can thus be generated from such "neural MBTF," which is expressed as follows:

$$M(\mu, \sigma, \omega_i, \omega_o) = F(P(\mu, \sigma), \omega_i, \omega_o), \quad (2)$$

where $P(u, \sigma)$ represents a reflectance feature vector lookup from the neural-texture pyramid P and the decoder network F evaluates the final reflectance from the reflectance feature vector given input directions ($\omega_i$ and $\omega_o$).

3. Neural-texture Pyramid

Instead of having one single neural texture of dimension $2^k \times 2^k \times c$ (where k is some positive integer and c the number of channels), a neural-texture pyramid $P=\{T_S\}$ is used. The neural-texture pyramid includes a set of neural textures $T_S$. Each $T_S$ has a size $2^S \times 2^S \times c$, where each texel contains a c-channel latent reflectance feature vector. The notation s denotes the discrete level of details, and $0 \leq s \leq k$. Such pyramid structure enables encoding complex material appearance at multiple scales. This is similar to conventional mipmapping for color or BRDF textures, but the neural-texture pyramid can be used to render appearance effects caused by complex microgeometry. In addition, unlike conventional mipmaps, there is no simple operation that produces all texture levels from the finest one. The per-level neural textures are independent from one another, and each neural texture in the set is independently optimized. Such optimization ensures that the neural MBTF can represent appearance for the material at all levels.

Trilinear interpolation is utilized to fetch a reflectance feature vector $P(u, \sigma)$ at location u and (continuous) level $\sigma$. Similar to mipmapping, standard bilinear interpolation is used to obtain features for the spatial dimensions of the location coordinate u, followed by linear interpolation in the logarithmic space for the image scale. Note that logarithmic space is used since the scales express powers of 2. Thus, a reflectance feature vector v at $(u, \sigma)$ is computed by:

$$v = P(u, \sigma) = w_1 T \lfloor l \rfloor(u) + w_2 T \lceil l \rceil(u), \quad (3)$$

where $l = \log_2(\sigma)$, $w_1 = (\lceil l \rceil - l)$, $w_2 = (1 - \lfloor l \rfloor)$. Notations $\lfloor l \rfloor$, $\lceil l \rceil$ represent floor and ceiling operations, respectively. $T_S(u)$ is the bilinearly-interpolated neural texture lookup from the level s with resolution $2^s \times 2^s$ with infinite tiling (wraparound).

4. Decoder Neural Network

The decoder F is designed as a multi-layer perceptron network to regress the final reflectance from the reflectance feature vector queried from the neural-texture pyramid. The input of this network contains c+4 values, consisting of c values from neural textures and 4 values from the directions $\omega_i$ and $\omega_o$ (in direction encoded as 2 D points on the projected hemisphere). The multi-layer perceptron network includes an input layer, one or more intermediate layers, and an output layer for generating the light-reflectance values. In some embodiments, the multi-layer perceptron network includes 4 layers to increase computational efficiency, in which each intermediate layer has 25 output channels. The final 3-channel output layer is used to generate a RGB light-reflectance value of a corresponding texel of the textured surface, with an additional log(x+1) compression applied to better learn high dynamic range. ReLU is used as the activation function for all layers, including the final layer where it clamps the final output to be non-negative. Additionally or alternatively, a convolutional neural-network can be used to generate the light-reflectance values for rendering textured surfaces for a three-dimensional scene. To render realistic material with locally complex microgeometry, the multi-layer perceptron network is used as it can express the spatial information of the textured surface and encode complex microgeometry effects.

5. Offset-Prediction Neural Network

Baseline neural architecture can model various types of real materials. However, it is challenging for the baseline neural architecture to handle highly non-flat materials that have significant parallax and occlusion effects. For example, poor angular stability has been observed when learning non-flat materials by using the baseline architecture. An option to address this challenge is to increase the capacity of the multi-layer perceptron neural network (e.g., increase the number of intermediate layers, increase the number of channels per intermediate layer) to potentially approximate any MBTF function. This option, however, can lead to longer rendering times. A larger neural network is also likely to result in a slower training rate as the neural texture needs to learn correlated information across multiple pixels for different camera directions.

To improve results on complex non-flat materials, a neural offset module is used. The neural offset module includes an offset-prediction neural network that predicts a coordinate offset for the feature texture lookup. In particular, instead of directly using the intersection location $u \in R^2$, the offset-prediction neural network $O(u, \omega_o)$ is used to calculate a new lookup location:

$$u_{new} = u + O(u, \omega_o) \quad (4)$$

Figure 4:
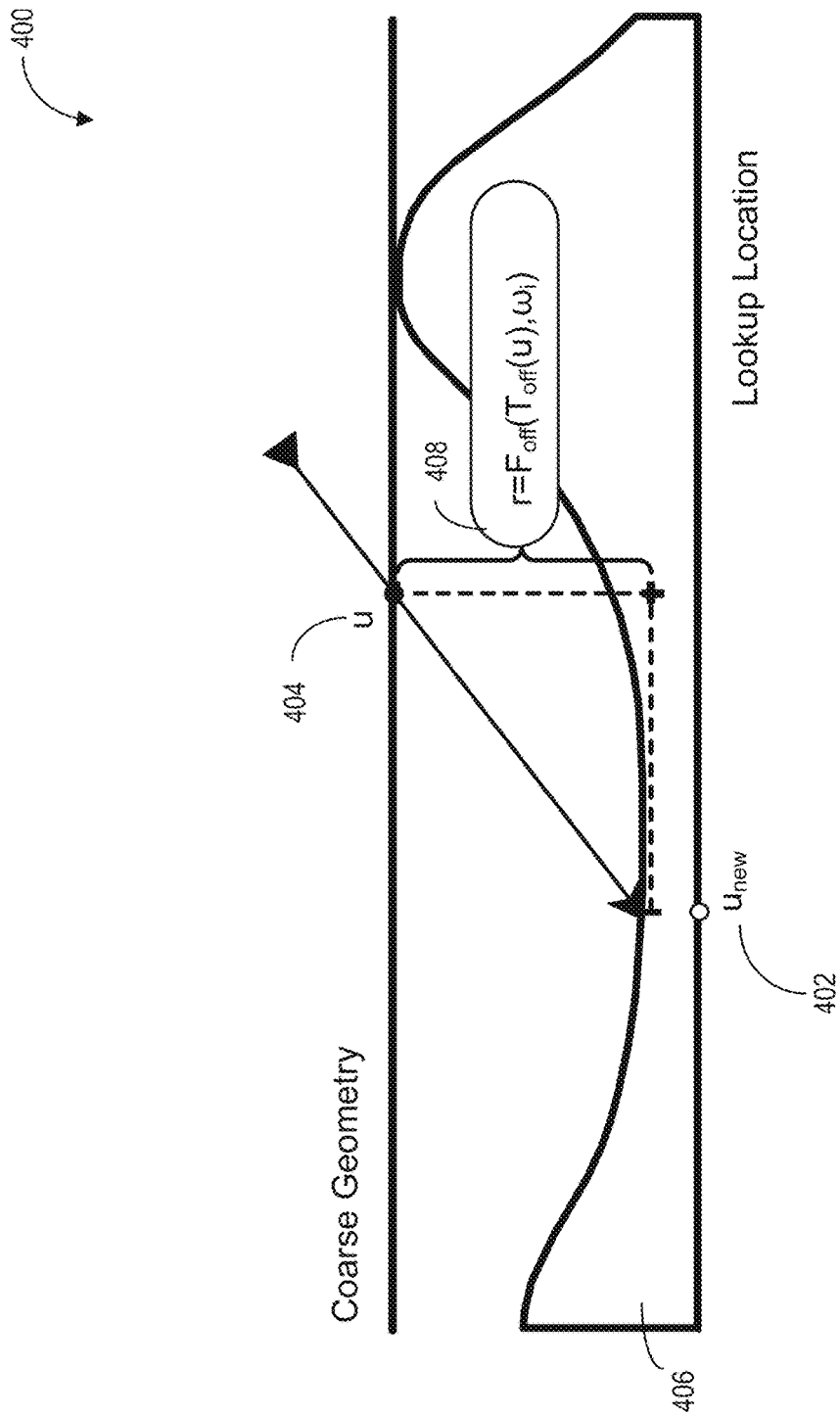
FIG. 4 illustrates an example illustration of how neural-offset module identifies an offset coordinate, according to some embodiments.

FIG. 4 illustrates an example illustration of how neural-offset module identifies an offset coordinate, according to some embodiments. As shown in FIG. 4, the neural-offset module determines an offset coordinate 402 for a given coordinate 404 of a material surface 406. Instead of predicting the uv-space offset directly, the neural-offset module predicts a depth 408 under the intersection with the reference plane. The depth 408 can then be converted to the offset coordinate 402 by assuming a locally flat surface. To determine the offset coordinate, the neural-offset module does not need to use actual heightfield is used to perform supervised training of its neural network. In effect, with the help of neural offsets, the lookup location of the texture can be slightly adjusted depending on the viewing direction, achieving effects such as parallax.

Thus, instead of directly regressing a 2 D offset, an offset-prediction neural network is trained to regress a 1 D scalar value r representing the ray depth at the intersection which can be easily turned into the final 2 D offset given the view direction $\omega_o$.

Figure 5:
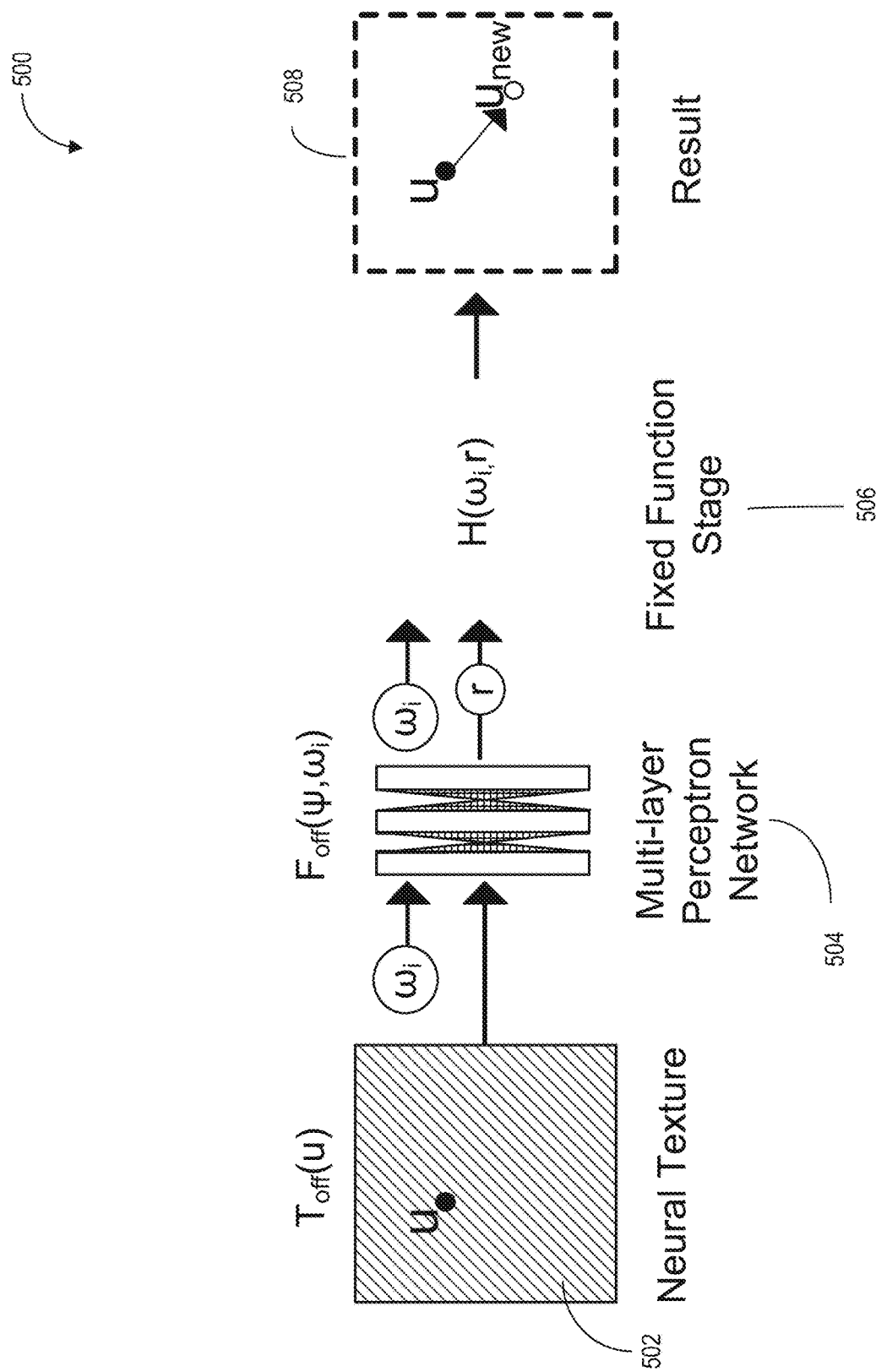
FIG. 5 illustrates an example schematic diagram for generating the offset coordinates, according to some embodiments.

FIG. 5 illustrates an example schematic diagram for generating the offset coordinates, according to some embodiments. As shown in FIG. 5, the neural offset module determines the offset coordinate based on the following scheme: (i) a neural-offset texture $T_{off}$ 502; (ii) a multi-layer perceptron neural network $F_{off}$ 504 that regresses the ray depth r from $T_{off}$; and (iii) a fixed function H 506 that outputs an offset 508. In some embodiments, the multi-layer perceptron neural network is a type of a deep artificial neural network that includes multiple layers of perceptrons (e.g., an input layer, one or more hidden layers, an output layer). A perceptron can be a single-layer neural network that can form a layer of the multi-layer perceptron neural network. The design of using the neural-offset texture 502 and the multi-layer perceptron neural network 504 is similar to the baseline MBTF network described above, except the texture look-up is bilinear (no pyramid). The ray depth r is computed based on the following expression:

$$r = F_{off}(\Psi, \omega_o) = F_{off}(T_{off}(u), \omega_o) \quad (5)$$

where $\Psi = T_{off}(u)$ is the latent reflectance feature vector lookup in $T_{off}$ on the initial location u. The multi-layer perceptron neural network $F_{off}$ takes the latent vector $\Psi$ and the viewing direction $\omega_o$ as input. The offset-prediction neural network can include one or more intermediate layers (e.g., four intermediate layers). Each layer of the offset-prediction neural network outputs 25 channels (except for the last one), with ReLU activation functions in between. Given the estimated ray depth r, the offset is computed by the following expression of the fixed function H:

$$H(r, \omega_o) = \frac{r}{\max(\omega_z, .6)}(\omega_x, \omega_y), \quad (6)$$

where $\omega_x, \omega_y, \omega_z$ are the components of $\omega_o$. Therefore, the final form of the neural offset query is:

$$U_{new} = u + H(r, \omega_o) = + \frac{r}{\max(\omega_z, .6)}(\omega_x, \omega_y). \quad (7)$$

The new lookup location $u_{new}$ can be used in place of u to lookup a latent vector in the neural-texture pyramid in eq. 2. Additionally or alternatively, the offset-prediction neural network can also learn the 2 D offset function $O(u, \omega_o)$ directly, although using a hard-coded function $H(r, \omega)$ results in an improvement in image quality.

Figure 6:
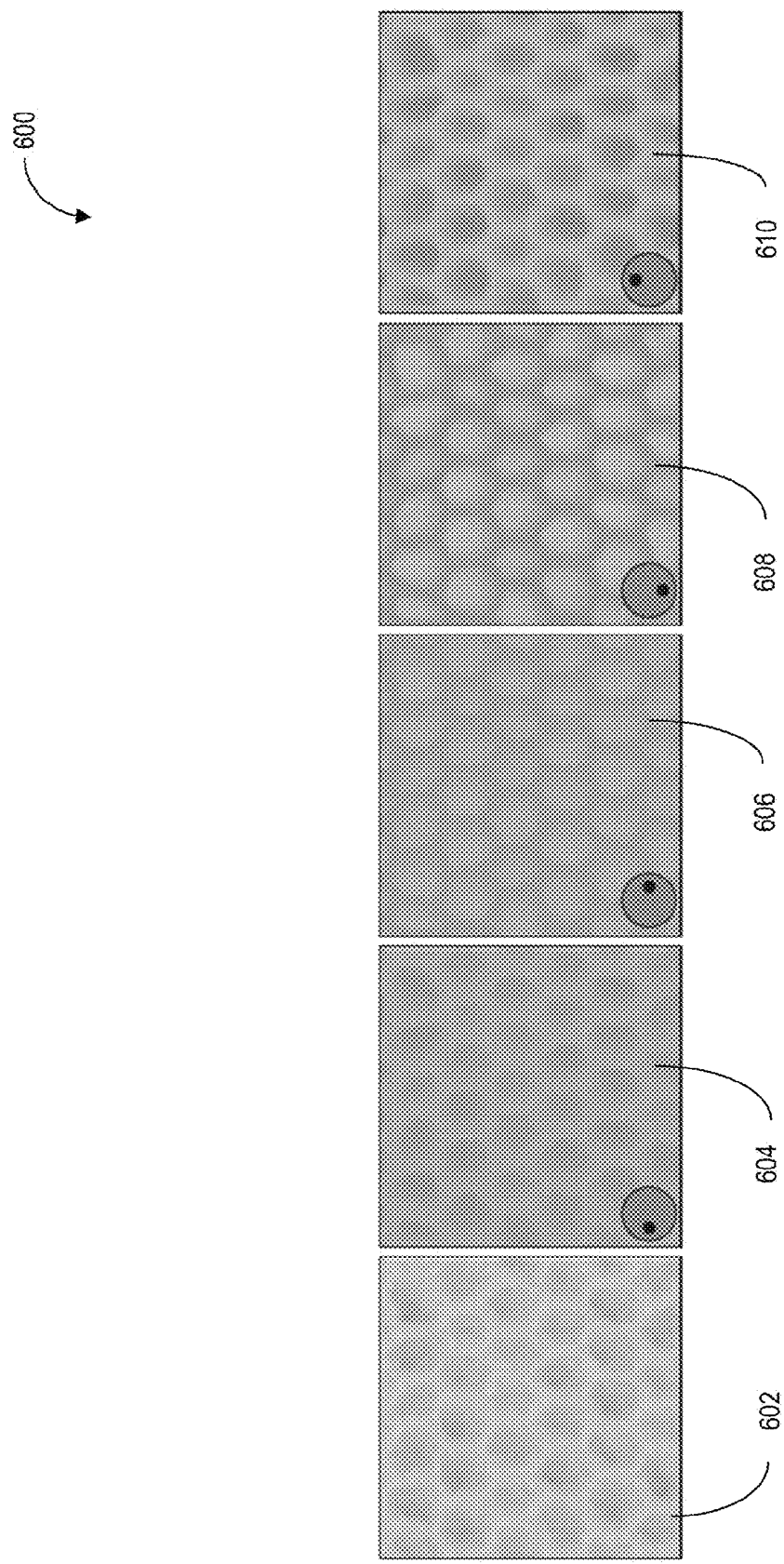
FIG. 6 shows an example set of images depicting textured surfaces for which offsets were applied, according to some embodiments.

FIG. 6 shows an example set of images depicting textured surfaces for which offsets were applied, according to some embodiments. FIG. 6 visualizes the predicted offsets learned by the neural-offset module on a highly non-flat surface. In this example, the highly non-flat surface consists of a turtle shell pattern. Neural-offset feature texture 602 shows three out of seven channels shown as RGB colors. The neural-offset feature texture 602 is used to identify reflectance feature vectors that can subsequently be used to determine offsets for the textured surface. Textured surfaces 604-610 respectively show examples of textured surfaces with computed 2 D offset, each of which being color-coded using red/green for the two components. In addition, the blue circle of each of textured surfaces 604-610 shows a respective incoming ray direction on a projected hemisphere.

6. Enhanced Architecture Incorporating the Offset-Prediction Neural Network

The enhanced architecture for generating the light-reflectance values can be represented by prepending the neural offset module to the baseline architecture. In particular, the neural offset module is used to obtain a new location $u_{new}$ (Eq. 7) by translating the original input u. Then, $u_{new}$ is used to query a reflectance feature vector from the neural-texture pyramid P (eq. 3). Finally, an MLP material decoder F is used, in conjunction with incoming/outgoing radiance directions, to determine the light-reflectance value for the original input u. For example, a full neural MBTF corresponding to the enhanced architecture can be represented by the following expression:

$$M(u, \sigma, \omega_i, \omega_o) = F(P(u + O(u, \omega_O), \sigma), \omega_i, \omega_o), \quad (8)$$

The enhanced architecture can be fully differentiable and enable end-to-end training (e.g., via backpropagation) that simultaneously optimizes the offset-prediction neural network, the neural-texture pyramid, and the decoder neural network. In some instances, the offset-prediction neural network is trained using unsupervised training. In other words, no ground truth offsets are provided, and some training data (e.g. volumetric or fiber-based materials) may not include well-defined correct offset. Even so, textured surfaces can be accurately rendered based on the trained neural networks of the enhanced architecture. The end-to-end training thus facilitates the combined networks to jointly auto-adjust their respective parameters such that the networks can render textured surfaces having the best visual quality.

D. TRAINING SURFACE-RENDERING NEURAL NETWORKS FOR GENERATING LIGHT-REFLECTANCE VALUES OF A TEXTURED SURFACE

The surface-rendering neural networks including an offset-prediction neural network, a neural-texture pyramid, and a decoder neural network can be trained to accurately represent a variety of complex materials at different scales. The neural architecture learns a multi-scale bidirectional texture function (MBTF): a 7-dimensional function, with two dimensions each for the query location, incoming and outgoing radiance direction, and one dimension for the filter kernel radius. As part of the architecture, a neural offset technique has been introduced for rendering complex geometric appearance including parallax effects without tessellation, trained in an unsupervised manner. The encoderless architecture can be trained from a small number of random queries per texel (200-400). These queries can come from real or synthetic data. A number of results are shown, demonstrating high quality appearance with accurate displacement, parallax, self-shadowing, and other effects. Due to compact network architecture, real-time performance is even achieved in the OptiX implementation. This approach will stimulate further research on neural representations of materials that are difficult or expensive to handle with classical methods.

1. Training Data Preparation

Each of the offset-prediction neural network, neural-texture pyramid, and the decoder network can be trained using raw images or synthetic images. For example, a synthetic training image is generated by: (a) constructing a microgeometry of a textured surface; (b) using a standard path tracer with a custom camera ray generator to render the required queries of the textured surface; and (c) using a smoothed directional lighting with unit irradiance on the reference plane, to ensure valid radiometric properties. In some embodiments, the microgeometry is constructed by meshing and displacing a high-resolution heightfield texture and deriving other reflectance properties (albedo, roughness, metallicity, micro-scale normal) from additional textures. In an example implementation, the synthetic training image is generated in about 30 minutes on a 32-core CPU, using 64 samples per query in a standard rendering engine.

2. Training Process

Each of surface-rendering neural networks deployed for rendering textured surfaces is fully differentiable, but can be trained together end-to-end. Each raw or synthetic training image includes a training data for each texel of the image. For example, the training data includes a 7-dimensional query that includes the light direction, camera direction, uv-location, and kernel radius. The surface-rendering neural networks generate RGB colors that identify a light-reflectance value of the texel, at which back-propagation is used to update the network parameters and neural textures (e.g., values of latent variables that correspond to a reflectance feature vector). For example, a training batch includes approximately a million queries ($2^{20}$). The number of queries in the training batch is much larger than the number of input MBTF queries per texel, thus allowing a single training batch to update many texels. The surface-rendering neural networks can be trained until convergence is achieved (e.g., approximately 30000 iterations). In an example implementation, the training time took about 45 minutes for a $512^2$ maximum resolution, and about 90 minutes for a $1024^2$ maximum resolution, based on a single graphic processing unit.

If reflectance feature vectors are optimized individually for each texel, this can result in noisy neural textures. As a result, objects rendered with such materials will have a noisy appearance, reminiscent of Monte Carlo noise. This is especially true for the neural offset texture. To address this issue, a Gaussian blur is applied during training with initial standard deviation of $\sigma_i=8$ texels to the neural textures. As the training progresses, a is relaxed exponentially over time with a half-life h=3333 iterations: $\sigma(t)=\sigma_i \cdot 2^{-t/h}$.

3. Rendering Textured Surfaces for Evaluation

Neural materials can be integrated into Monte Carlo rendering engines, such that light can seamlessly interact across regular objects and objects with neural materials. The results shown in the illustrative example use Mitsuba rendering engine for rendering the textured surfaces. The surface-rendering neural networks can be integrated into a rendering system in various ways. For example, to integrate with Mitsuba, the surface-rendering neural networks can be configured to ensure exactly matching outputs between training and rendering. In some instances, material query buffers are used. In the integrator, one bounce is traced at a time. When an intersection is encountered, the query is put in the buffer, and tracing is continued. In another example, an interactive path-tracer using the Nvidia OptiX framework is implemented. Network inference is re-implemented directly using the CUDA programming language (not using any external inference libraries).

If a surface with neural material is hit, the neural module needs to be evaluated. Further, for the evaluation, there is also a need to sample an outgoing radiance direction for indirect illumination. In one example, sample indirect rays are sampled according to the cosine-weighted hemisphere, thereby constraining the range of rays being sampled. For each shading point, the material can be evaluated up to twice: (i) for the light sample; and (ii) for the BRDF sample. In some instances, the whole buffer is sent to graphic processing unit for batch evaluation. Additionally or alternatively, the MBTF evaluation function can be called for each surface shading event directly, with no batching.

E. EXAMPLE RESULTS

In this section, the abilities of the neural method to represent and render a range of material appearances are showcased, with training data coming from different input representations: displaced height-field geometry with varying reflectance properties, fiber geometry, and measured data.

For the evaluation, generating light-reflectance values using surface-rendering neural networks can be divided into 2 stages. During the first stage, the neural offset module is used and the latent vector v is obtained, which can be cached. This is because the first stage requires only camera direction and is independent of the light direction. During the second stage, the fully connected network is just evaluated, F for a given incoming and outgoing light direction. Thus, if evaluation is desired based on multiple light directions, only the second stage needs to be evaluated.

The OptiX version achieves real-time performance of 60 frames per second (one path per pixel per frame) for a textured surface having 1920×1080 resolution. No specialized hardware such as Tensor Cores has been used.

1. Processing Time

Figure 7:
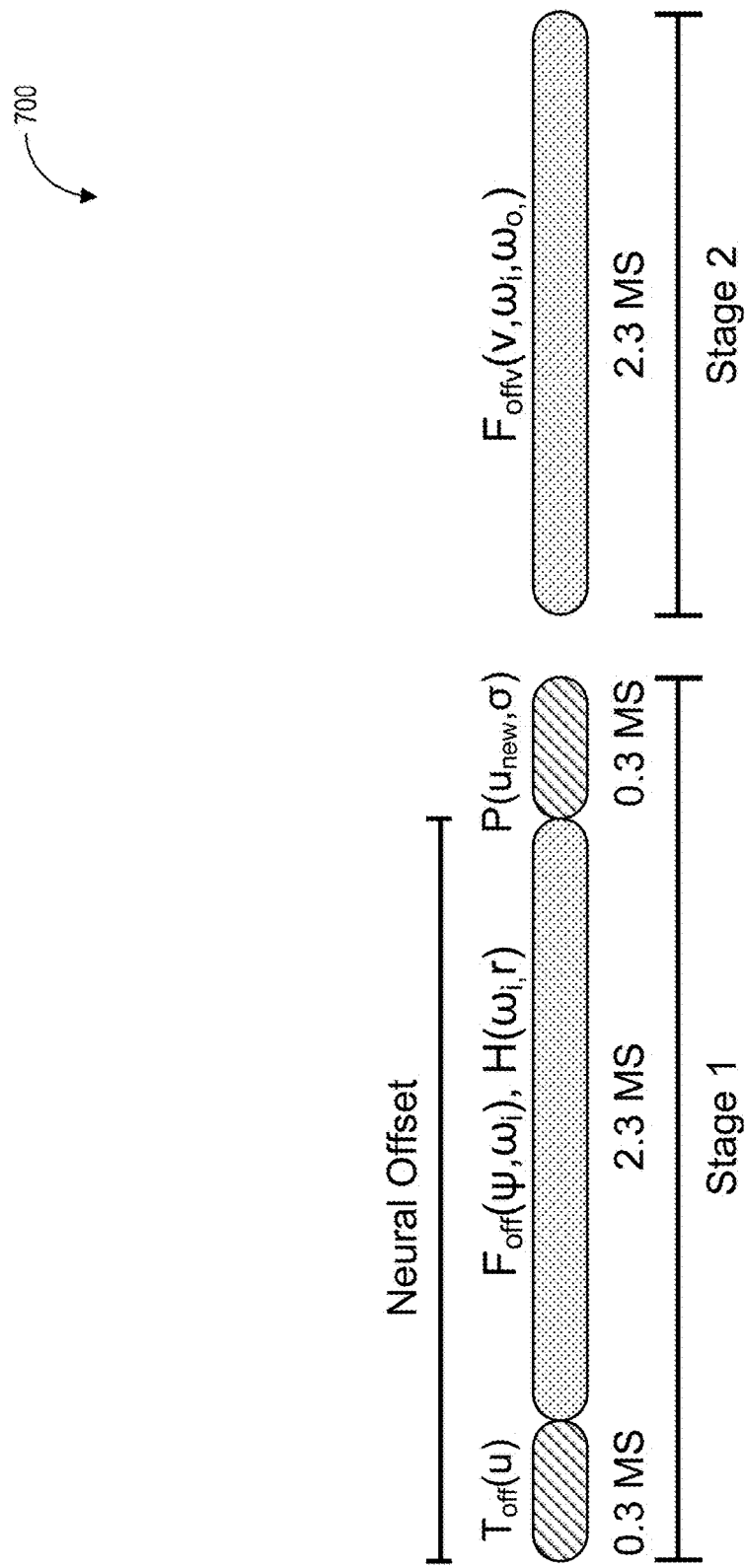
FIG. 7 shows a timing breakdown of surface-rendering neural networks for rendering a textured surface.

FIG. 7 shows a timing breakdown of surface-rendering neural networks for rendering a 1920×1080 textured surface. A query was generated for each pixel of the textured surface. The dark-shaded color indicates the neural texture lookup section and the light-shaded color indicates the decoder neural network evaluation. In this example, evaluation of the surface-rendering neural networks were split into two stages. Stage 1 is independent of the light direction. For a different light direction, only Stage 2 was needed for reevaluation.

In particular, as shown in FIG. 7, the surface-rendering neural networks generated light-reflectance values in 5 ms. A large portion of the processing time is taken by fully connected layers. Nonetheless, the surface-rendering neural networks performed significantly faster than other surface-texture rendering techniques. For example, the rendering techniques disclosed in Rainer et al, *Neural BTF Compression and Interpolation. Computer Graphics Forum* (Proceedings of Eurographics) 38, 2 (2019), 235-244 rendered the textured-surfaces in approximately 92 ms.

2. Comparisons with Conventional Techniques

Figure 8:
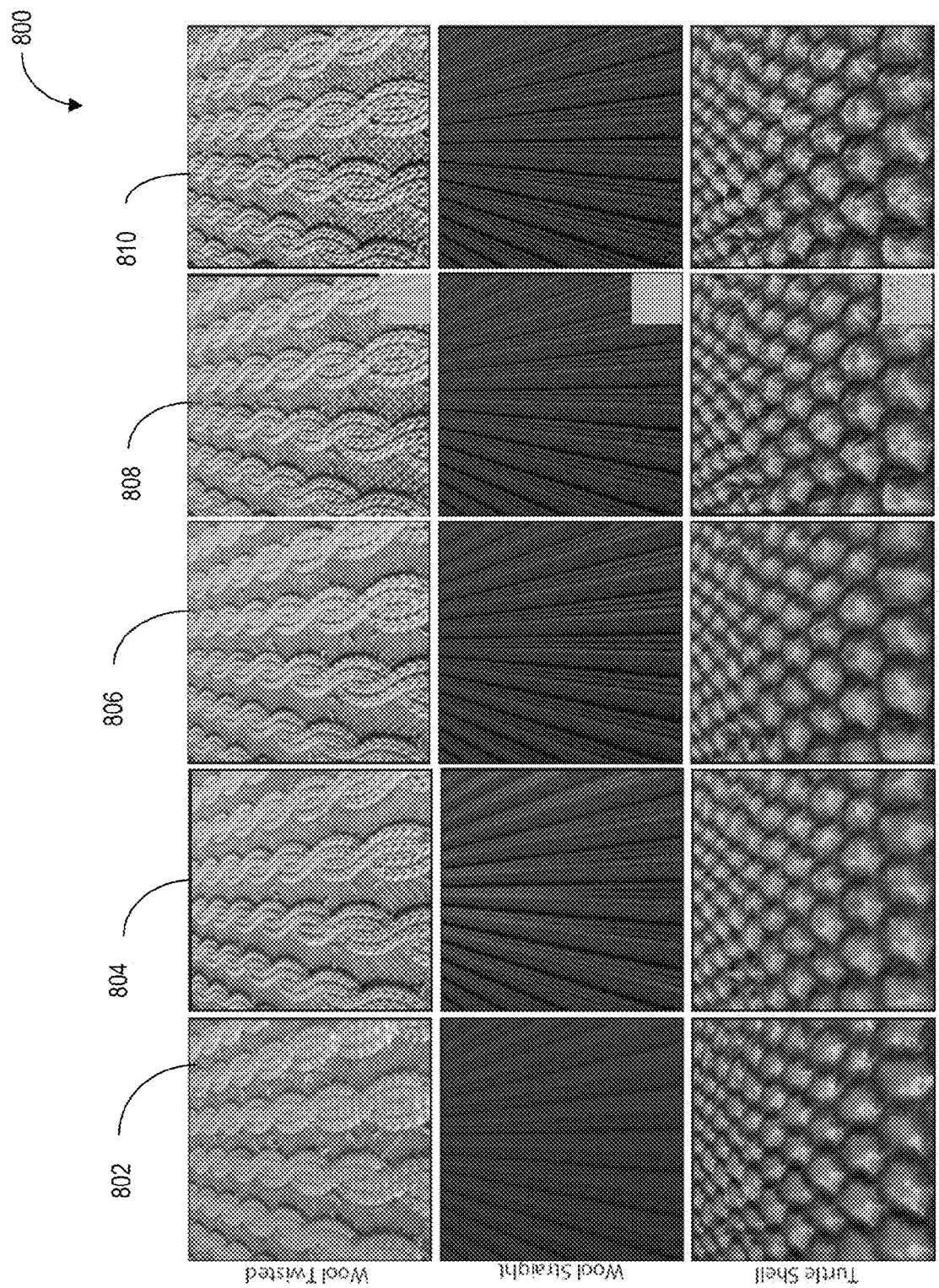
FIG. 8 shows an example set of images rendered for evaluating qualitative performance of surface-rendering neural networks against conventional techniques.

FIG. 8 shows an example set of images 800 rendered for evaluating qualitative performance of surface-rendering neural networks against conventional techniques. The textured surfaces 802-810 are shown on a flat plane, with camera and directional light at an angle. The surface-rendering neural networks were compared against several different conventional techniques, including a first conventional rendering technique 802 implemented using Rainer et al, *Neural BTF Compression and Interpolation. Computer Graphics Forum* (Proceedings of Eurographics) 38, 2 (2019), 235-244 and a second conventional rendering technique 804 implemented using Rainer et al., *Unified Neural Encoding of BTFs*. Computer Graphics Forum (Proceedings of Eurographics) 39, 2 (2020), 167-178. To provide further comparison data, textured surfaces were generated using surface-rendering neural networks without neural offset 806 and surface-rendering neural networks with neural offset 808. Finally, a ground truth textured surface 810 was computed by path-tracing of the synthetic material structure. The materials are mapped to a plane, viewed at an angle and lit by a single light slightly to the left.

As shown in the example set of images, the baseline surface-rendering neural networks 806 outperformed both conventional techniques 802 and 804, despite being trained with less training data (e.g., fewer BTF queries). The improvement can be due to the decoder-only architecture, which can adapt to the material and benefits from a stochastic distribution of the input BTF queries. The improvement can also be attributed to improved training techniques (especially the progressively decaying spatial Gaussian blur). The multi-resolution nature of the neural-texture pyramid also contributed to the increase image quality.

Surface-rendering neural networks with neural offset 808 performed even better in rendering textured surfaces. The neural offset thus adds even better handling of parallax effects on top of the baseline result. The textured surfaces 808 include small insets that respectively show the color-coded 2 D neural offset. The match with reference images 810 is close, with a minor loss in shadow contrast (the hard shadows form a reflectance discontinuity which is hard to learn perfectly).

3. Comparison with BTF

Figure 9:
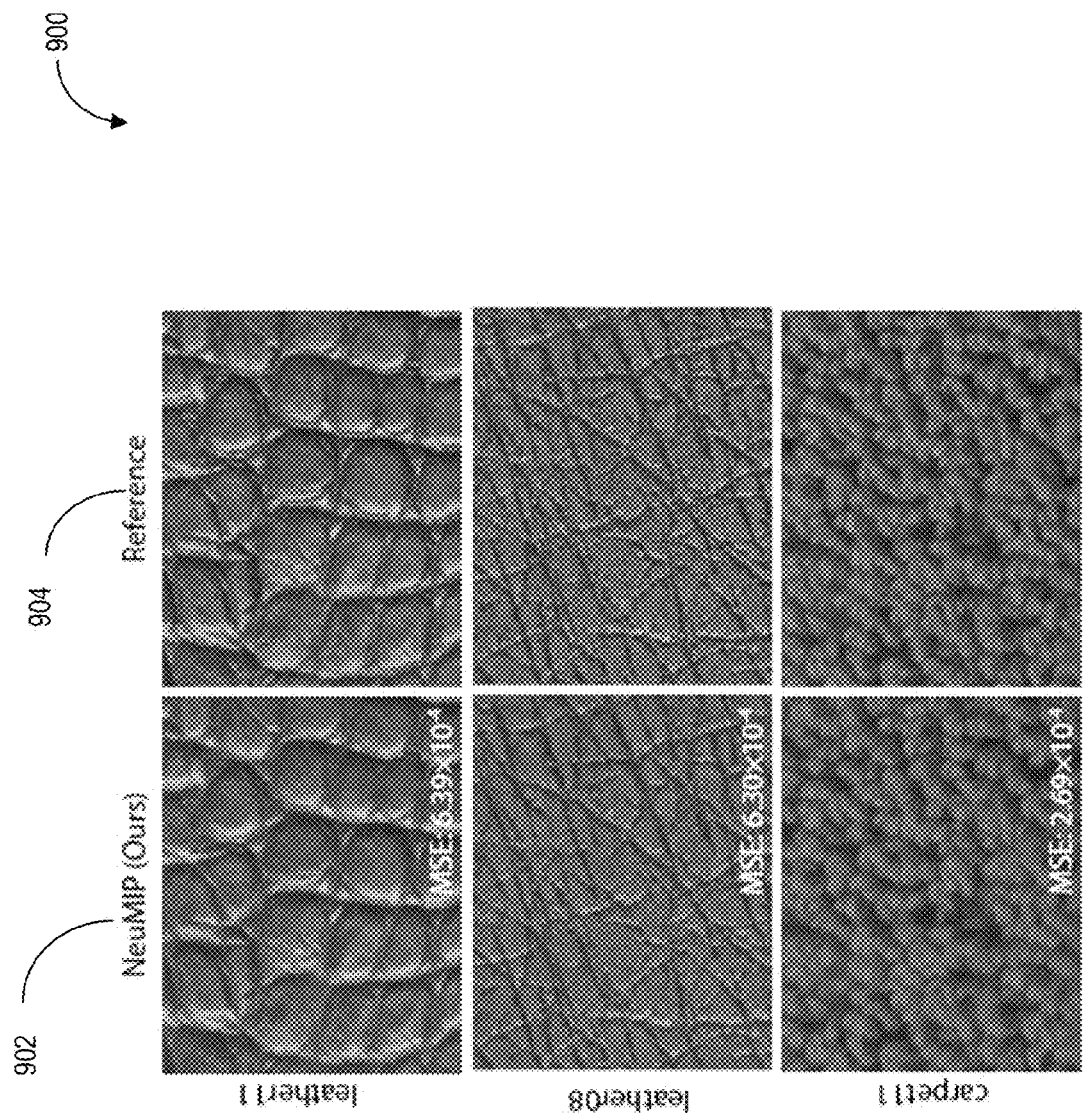
FIG. 9 shows an example set of images rendered for evaluating qualitative performance of surface-rendering neural networks against real BTF data.

FIG. 9 shows an example set of images 900 rendered for evaluating qualitative performance of surface-rendering neural networks against real BTF data. As shown in FIG. 9, the textured surfaces rendered included two types of leathers and carpet. The textured surfaces 902 rendered by the surface-rendering neural networks were compared against reference surfaces 904 rendered from their respective real BTF data. The real BTF data include BTFs constructed from real, physical materials with their camera directions (UBO 2014 dataset), but without explicitly extracting a heightfield from the materials. The surface-rendering neural networks were trained with a random set of BTF queries from any image source (e.g., real images, synthetic images).

As shown in FIG. 9, the textured surfaces 902 and 904 both show highly accurate textured surfaces. In particular, as shown in per-pixel mean-squared errors shown for each materials, the surface-rendering neural networks were able to generate accurate textured surfaces that are substantially similar to real BTF data acquired from physical material samples. However, the surface-rendering neural networks takes significantly less time needed for training and rendering.

4. Textured Surfaces across Image Scales

Figure 10:
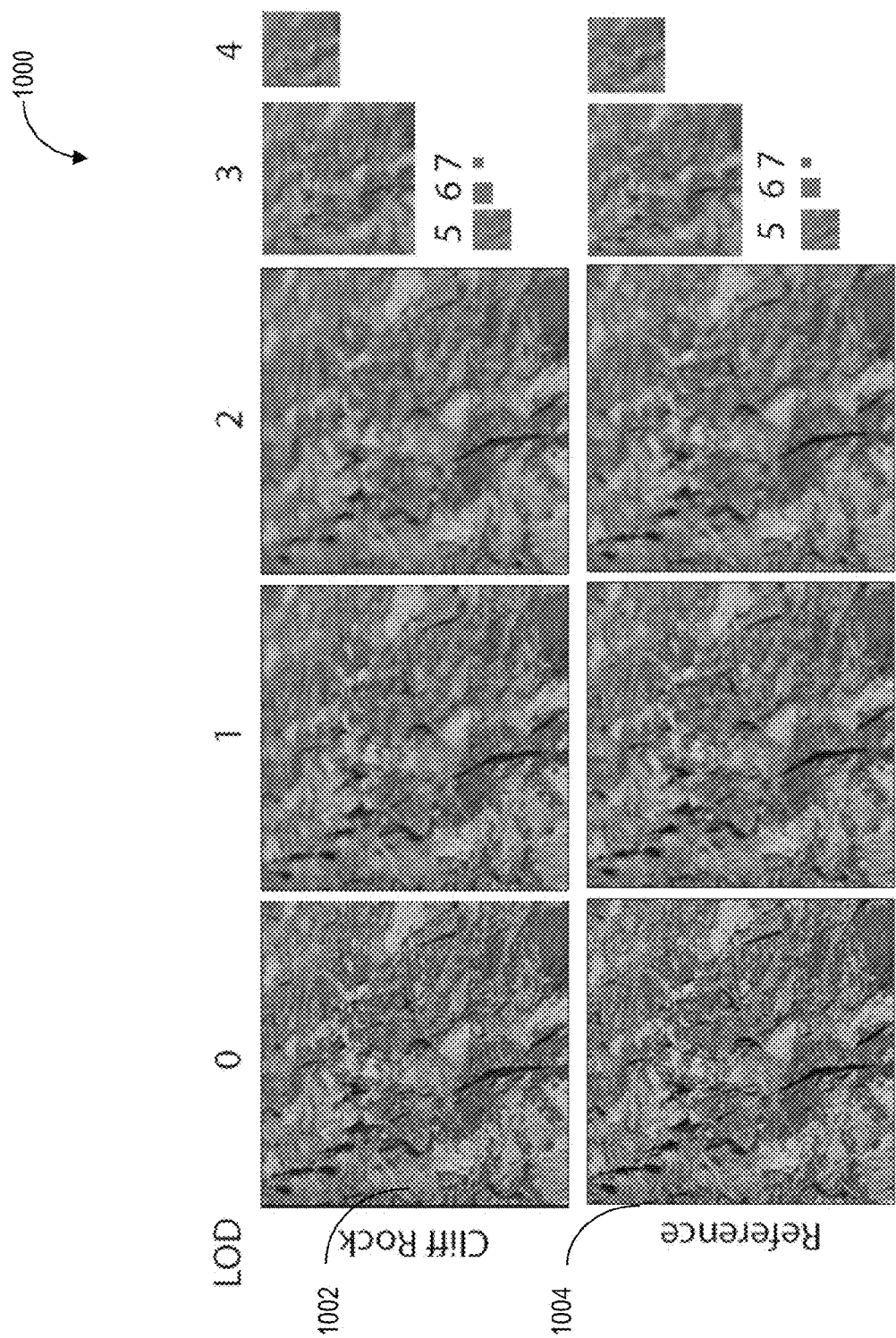
FIG. 10 shows an example set of images of materials rendered across various scales.

FIG. 10 shows an example set of images 1000 of materials rendered across various scale. The example set of images 1000 include cliff-rock surfaces rendered using the surface-rendering neural networks 1002 and reference surfaces 1004. Each surface image is associated with a corresponding limit-of-detection (LOD) level, which indicative of its scale. As shown in FIG. 10, image quality of the textured surfaces rendered using the surface-rendering neural networks 1002 was on par with the reference surfaces 1004.

It has been observed that, with higher (coarser) levels in the multiresolution hierarchy and the more distant zooms (e.g., large filter kernels), the errors actually tend to decrease. This is because materials at a coarse level of detail tend to have fewer high-frequency details. As a result, it becomes even easier to optimize corresponding reflectance feature vectors from the neural texture pyramid and the network at those levels of detail.

5. Network Size

To evaluate efficiency of the present techniques, neural network sizes of the surface-rendering neural networks to those of conventional techniques. The sizes are shown in Table 4. For fair comparison, we only count the number of weights in decoders for both conventional techniques, as encoders are not needed for deployment in a rendering system.

As shown in Table 2, not only do the surface-rendering neural networks (indicated as "SSRN") have lower MSE (Mean Squared Error) scores, they have approximately 10-11 times fewer weight parameters compared to decoders of the conventional techniques. The surface-rendering neural networks also use less than half the number of channels for the neural textures in conventional techniques. This is because the surface-rendering neural networks do not require universality. In addition, because the surface-rendering neural networks are divided into two stages via a neural offset module, the network representative power is increased compared to a simple multi-layer perceptron architecture.

TABLE 2

|  | The total number of network parameters | | |
|---|---|---|---|
|  | SRNN | Rainer19 | Rainer20 |
| # of network weights | 3332 | 35725 | 38269 |
| Ratio of weights vs ours | N/A | 10.7 | 11.5 |
| # of texture channels | 14 | 14 | 38 |

6. Ablation Evaluation

Figure 11:
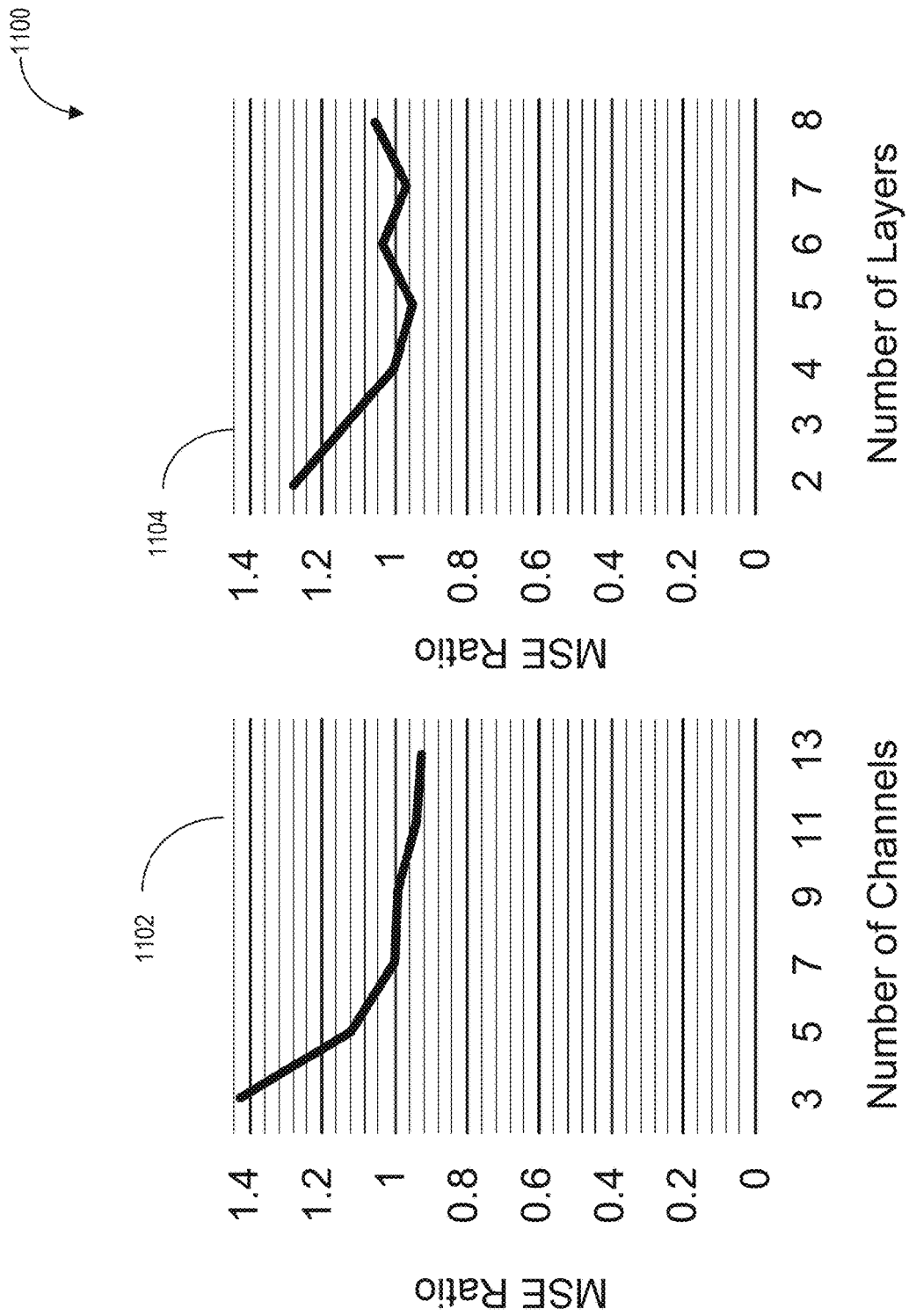
FIG. 11 shows a set of graphs that identify mean-square error ratio calculated for a respective number of channels used by surface-rendering neural networks.

FIG. 11 shows a set of graphs 1100 that identify mean-square error ratio calculated for a respective number of channels used by surface-rendering neural networks. For example, graph 1102 shows a ratio of MSE errors of a given network and the default network with respect to the number of channels in two neural textures. The ratio of MSE errors rapidly decreased until 7 channels were used. Graph 1104 shows a ratio of MSE errors of a given network and the default network with respect to the number of layers in the network. The ratio of MSE errors rapidly decreased until 4 layers were used. These MSE ratios indicate that a high level of accuracy can be achieved with relatively lower number of channels and layers thereby resulting in reduction of computational costs for rendering the textured surfaces.

Thus, the surface-rendering neural networks can be designed based on the above factors, to not only maintain high quality of the results but also decrease processing time and storage requirements. For example, the surface-rendering neural networks use 7-channel textures for each of the neural-offset texture (for identifying offset feature vectors) and the textures in the neural-texture pyramid (for identifying reflectance feature vectors), which resulted in a good trade-off between quality and processing time. Similarly, each of the offset-prediction neural network and the decoder neural network used 4 layers.

7. Additional Renderings

Figure 12:
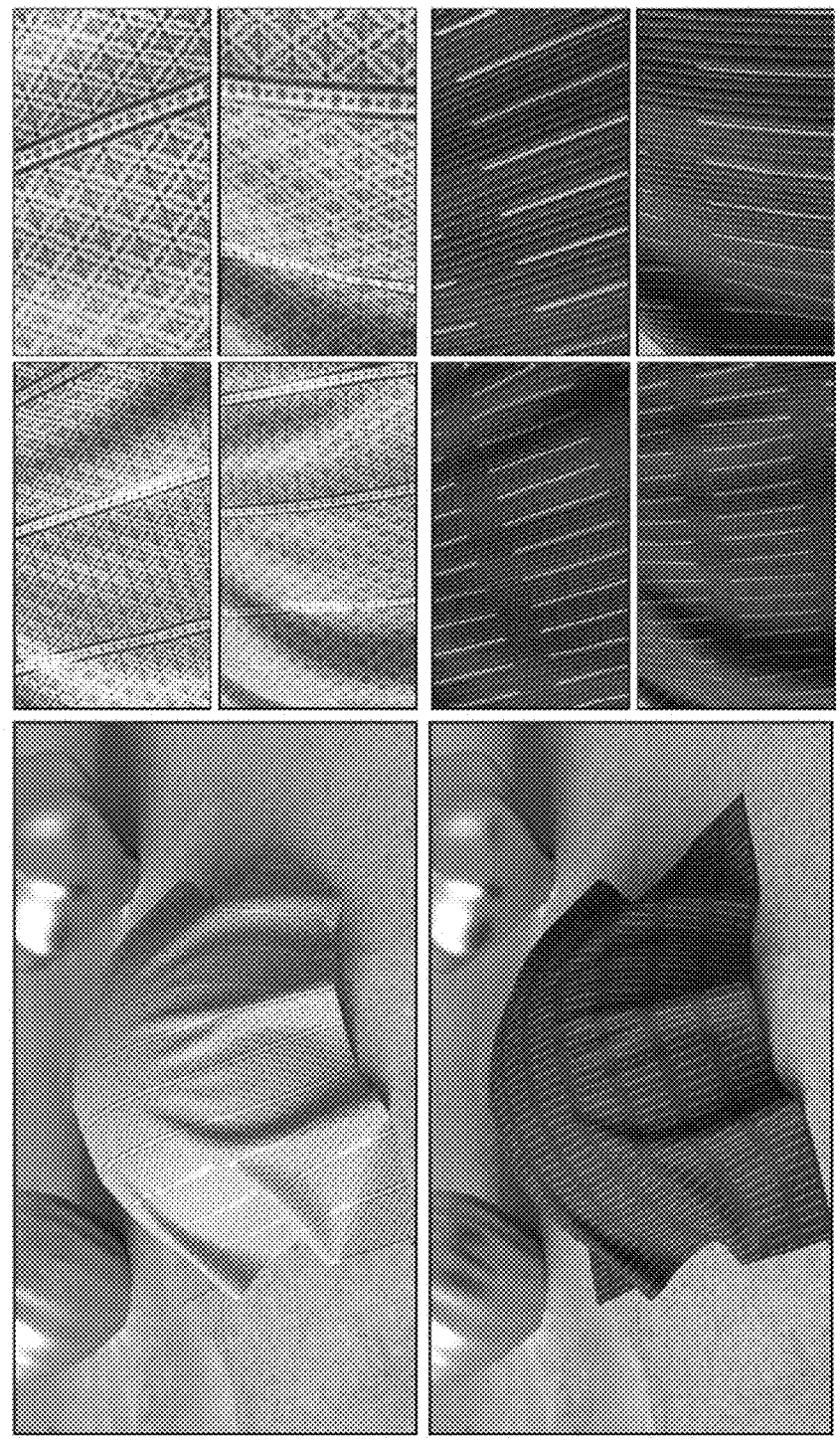
FIG. 12 shows an example set of images that depict textured surfaces rendered with various types of fabric materials.

FIG. 12 shows an example set of images 1200 that depict textured surfaces rendered with various types of fabric materials. The fabrics were modeled as heightfields with spatially varying reflectance properties. Each of the set of images depict highly accurate textured surfaces across various camera, light directions, and multiple zoom levels.

Figure 13:
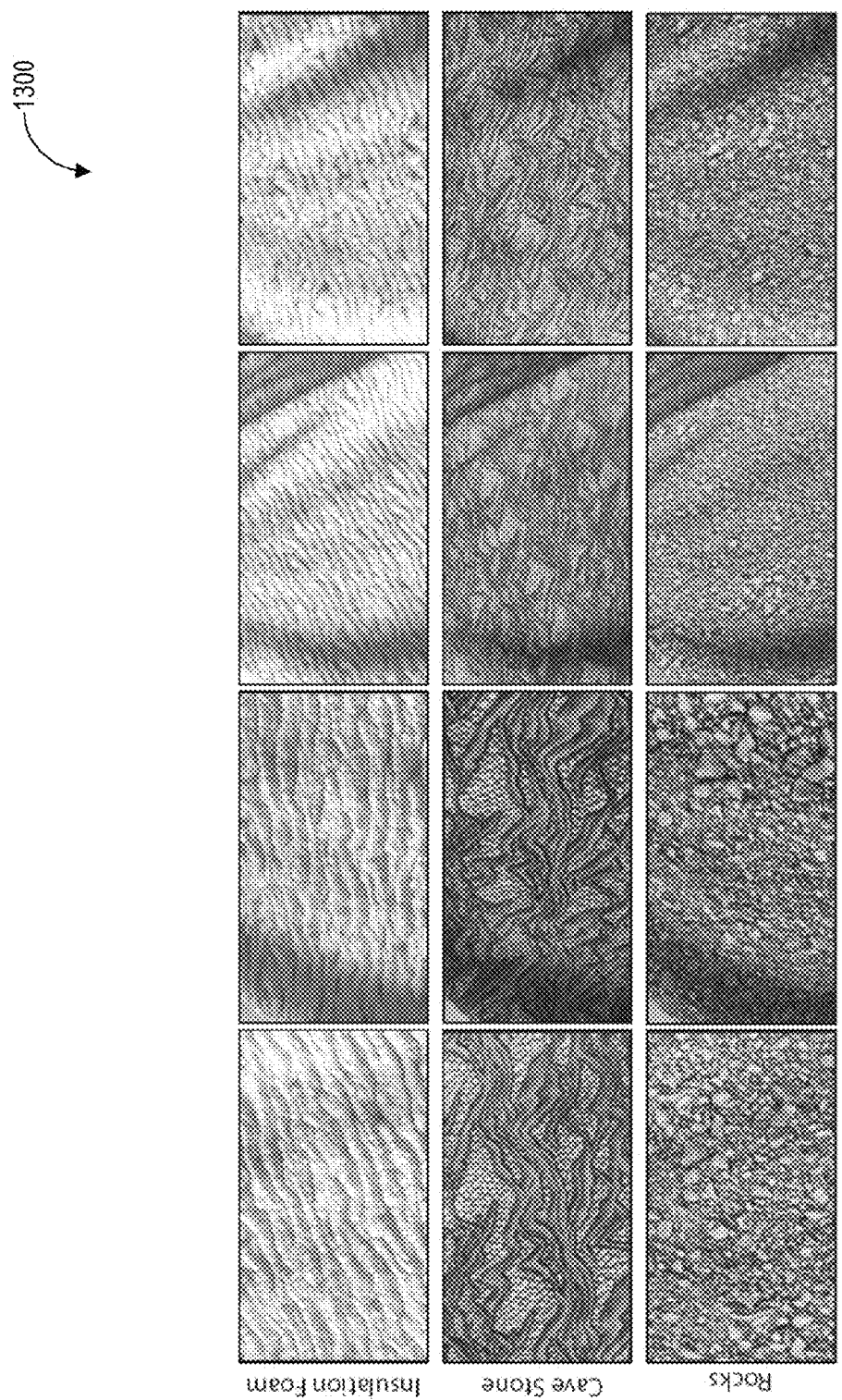
FIG. 13 shows an example set of images that depict textured surfaces rendered with various types of textures.

FIG. 13 shows another example set of images 1300 that depict textured surfaces rendered with various types of textures. As shown in FIG. 13, other types of textures such as insulation foam, cave stone, and rocks were rendered using the surface-rendering neural networks, which resulted in high image quality.

F. ADDITIONAL EMBODIMENTS

The surface-rendering neural networks can be used to train additional material structures. In some instances, more advanced importance sampling (e.g. by fitting multi-lobe parametric distributions per texel) can be performed, in which the parameters of such a distribution could be stored in small additional textures. A straight-forward extension would be to support semitransparent materials by predicting alpha transparency in addition to reflectance.

For specular materials, the surface-rendering neural networks can be trained by fitting the parameters of a parametric pdf model (e.g. a weighted combination of a Lambertian and microfacet lobe of a given roughness) per texel. The benefit of this solution would be that no additional neural network is required to sample, and path continuations can be decided independent of network inference.

In addition, very specular (e.g. glinty) materials would be hard to handle without blurring. The blurriness could be addressed by inserting randomness into the decoder, to synthesize some specular detail instead of attempting to fit it exactly. Thus, another direction would be to make the method support glinty specular effects, perhaps by inserting an additional random vector into the decoder, and training it with a GAN loss to generate stochastic detail matching the input data distribution.

G. EXAMPLE OF A COMPUTING ENVIRONMENT

Figure 14:
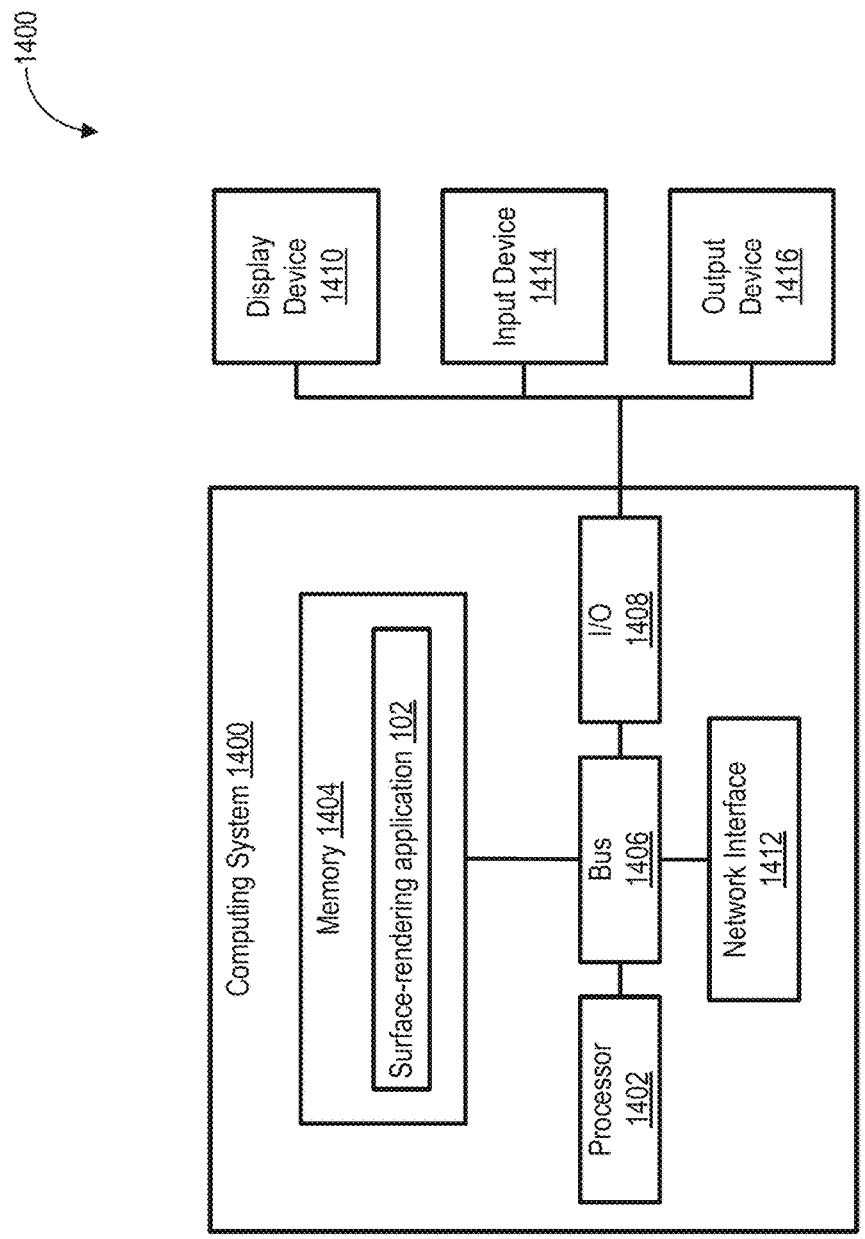
FIG. 14 depicts a computing system 1400 that can implement any of the computing systems or environments discussed above.

Any suitable computing system or group of computing systems can be used for performing the operations described herein. For example, FIG. 14 depicts a computing system 1400 that can implement any of the computing systems or environments discussed above. In some embodiments, the computing system 1400 includes a processing device 1402 that executes the surface-rendering application 102, a memory that stores various data computed or used by the surface-rendering application 102, an input device 1414 (e.g., a mouse, a stylus, a touchpad, a touchscreen, etc.), and an output device 1416 that presents output to a user (e.g., a display device that displays graphical content generated by the surface-rendering application 102). For illustrative purposes, FIG. 14 depicts a single computing system on which the surface-rendering application 102 is executed, and the input device 1414 and output device 1416 are present. But these applications, datasets, and devices can be stored or included across different computing systems having devices similar to the devices depicted in FIG. 14.

The example of FIG. 14 includes a processing device 1402 communicatively coupled to one or more memory devices 1404. The processing device 1402 executes computer-executable program code stored in a memory device 1404, accesses information stored in the memory device 1404, or both. Examples of the processing device 1402 include a microprocessor, an application-specific integrated circuit ("ASIC"), a field-programmable gate array ("FPGA"), or any other suitable processing device. The processing device 1402 can include any number of processing devices, including a single processing device.

The memory device 1404 includes any suitable non-transitory, computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 1400 may also include a number of external or internal devices, such as a display device 1410, or other input or output devices. For example, the computing system 1400 is shown with one or more input/output ("I/O") interfaces 1408. An I/O interface 1408 can receive input from input devices or provide output to output devices. One or more buses 1406 are also included in the computing system 1400. Each bus 1406 communicatively couples one or more components of the computing system 1400 to each other or to an external component.

The computing system 1400 executes program code that configures the processing device 1402 to perform one or more of the operations described herein. The program code includes, for example, code implementing the surface-rendering application 102 or other suitable applications that perform one or more operations described herein. The program code may be resident in the memory device 1404 or any suitable computer-readable medium and may be executed by the processing device 1402 or any other suitable processor. In some embodiments, all modules in the surface-rendering application 102 are stored in the memory device 1404, as depicted in FIG. 14. In additional or alternative embodiments, one or more of these modules from the surface-rendering application 102 are stored in different memory devices of different computing systems.

In some embodiments, the computing system 1400 also includes a network interface device 1412. The network interface device 1412 includes any device or group of devices suitable for establishing a wired or wireless data connection to one or more data networks. Non-limiting examples of the network interface device 1412 include an Ethernet network adapter, a modem, and/or the like. The computing system 1400 is able to communicate with one or more other computing devices (e.g., a computing device that receives inputs for surface-rendering application 102 or displays outputs of the surface-rendering application 102) via a data network using the network interface device 1412.

An input device 1414 can include any device or group of devices suitable for receiving visual, auditory, or other suitable input that controls or affects the operations of the processing device 1402. Non-limiting examples of the input device 1414 include a touchscreen, stylus, a mouse, a keyboard, a microphone, a separate mobile computing device, etc. An output device 1416 can include any device or group of devices suitable for providing visual, auditory, or other suitable sensory output. Non-limiting examples of the output device 1416 include a touchscreen, a monitor, a separate mobile computing device, etc.

Although FIG. 14 depicts the input device 1414 and the output device 1416 as being local to the computing device that executes the surface-rendering application 102, other implementations are possible. For instance, in some embodiments, one or more of the input device 1414 and the output device 1416 include a remote client-computing device that communicates with the computing system 1400 via the network interface device 1412 using one or more data networks described herein.

H. GENERAL CONSIDERATIONS

Numerous specific details are set forth herein to provide a thorough understanding of the claimed subject matter.

However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

What is claimed is:

1. A method comprising:
    receiving, by a surface-rendering application, image metadata for rendering a texel of a textured surface, wherein the image metadata includes a coordinate identifying a location of the texel, an incoming radiance direction, an outgoing radiance direction, and a kernel size;
    estimating, by the surface-rendering application and based on the image metadata, a light-reflectance value for the texel, wherein estimating the light-reflectance value includes:
        applying an offset-prediction neural network to the coordinate and the incoming radiance direction to predict an offset coordinate of the texel;
        inputting the offset coordinate to a data structure to determine a reflectance feature vector of the texel at the kernel size, wherein: (i) the data structure includes a set of neural textures; (ii) each neural texture of the set of neural textures includes a set of reflectance feature vectors at a respective kernel size; and (iii) each reflectance feature vector of the set of reflectance feature vectors includes one or more latent variables that encode visual characteristics of a respective texel; and
        applying a decoder neural network to the reflectance feature vector, the incoming radiance direction, and the outgoing radiance direction to estimate a light-reflectance value for the texel; and
    rendering, by the surface-rendering application and based on the light-reflectance value, the texel of the textured surface at the location, wherein the texel depicts at least part of the textured surface at an image scale that corresponds to the kernel size.

2. The method of claim 1, wherein the data structure is a neural-texture pyramid, and wherein values of the one or more latent variables of a reflectance feature vector are learned using a backpropagation algorithm.

3. The method of claim 1, wherein applying the offset-prediction neural network to the coordinate and the incoming radiance direction further includes:
    querying a neural-offset texture using the coordinate to identify an offset feature vector of the coordinate;
    applying the offset-prediction neural network to the offset feature vector and the incoming radiance direction to estimate a ray depth associated with the coordinate; and
    applying an offset function to the ray depth to predict the offset coordinate.

4. The method of claim 1, wherein querying the data structure further includes:
    identifying, from a first neural texture of the set of neural textures, a first location within the first neural texture based on bilinear interpolation of the offset coordinate;
    selecting a second neural texture of the set of neural textures based on the kernel size;
    interpolating the first location of the first neural texture to a second location within the second neural texture; and
    selecting a reflectance feature vector at the second location as the reflectance feature vector that represents the texel.

5. The method of claim 1, wherein the offset-prediction neural network is trained using an unsupervised training algorithm.

6. The method of claim 1, wherein the decoder neural network includes a multi-layer perceptron network.

7. The method of claim 1, wherein the offset-prediction neural network and the decoder neural network were trained together using a backpropagation algorithm.

8. The method of claim 1, wherein the decoder neural network was trained separately from a training of the offset-prediction neural network.

9. A system comprising:
    a neural offset module configured to:
        receive image metadata for rendering a texel of a textured surface, wherein the image metadata includes a coordinate identifying a location of the texel, an incoming radiance direction, an outgoing radiance direction, and a kernel size; and apply an offset-prediction neural network to the coordinate and the incoming radiance direction to predict an offset coordinate of the texel;

a neural-texture query module configured to:

receive, from the neural offset module, the offset coordinate of the texel; and inputting the offset coordinate to a data structure to determine a reflectance feature vector of the texel at the kernel size, wherein: (i) the data structure includes a set of neural textures; (ii) each neural texture of the set of neural textures includes a set of reflectance feature vectors at a respective kernel size; and (iii) each reflectance feature vector of the set of reflectance feature vectors includes one or more latent variables that encode visual characteristics of a respective texel;

a decoder configured to:

identify, from the image metadata, the incoming radiance direction and the outgoing radiance direction;

receive, from the neural-texture query module, the reflectance feature vector of the texel; and apply a decoder neural network to the reflectance feature vector, the incoming radiance direction, and the outgoing radiance direction to estimate a light-reflectance value for the texel; and a rendering engine configured to render, based on the light-reflectance value, the texel of the textured surface at the location, wherein the texel depicts at least part of the textured surface at an image scale that corresponds to the kernel size.

10. The system of claim 9, wherein the data structure is a neural-texture pyramid, and wherein values of the one or more latent variables of a reflectance feature vector are learned using a backpropagation algorithm.

11. The system of claim 9, wherein the neural offset module is further configured to:

querying a neural-offset texture using the coordinate to identify an offset feature vector of the coordinate;

applying the offset-prediction neural network to the offset feature vector and the incoming radiance direction to estimate a ray depth associated with the coordinate; and applying an offset function to the ray depth to predict the offset coordinate.

12. The system of claim 9, wherein the neural-texture query module is further configured to:

identifying, from a first neural texture of the set of neural textures, a first location within the first neural texture based on bilinear interpolation of the offset coordinate;

selecting a second neural texture of the set of neural textures based on the kernel size;

interpolating the first location of the first neural texture to a second location within the second neural texture; and selecting a reflectance feature vector at the second location as the reflectance feature vector that represents the texel.

13. The system of claim 9, wherein the offset-prediction neural network is trained using an unsupervised training algorithm.

14. The system of claim 9, wherein the decoder neural network includes a multi-layer perceptron network.

15. The system of claim 9, wherein the offset-prediction neural network and the decoder neural network were trained together using a backpropagation algorithm.

16. The system of claim 9, wherein the decoder neural network was trained separately from a training of the offset-prediction neural network.

17. A non-transitory computer-readable storage medium including instructions configured to cause one or more data processors to perform actions including:

receiving image metadata for rendering a texel of a textured surface, wherein the image metadata includes a coordinate identifying a location of the texel, an incoming radiance direction, an outgoing radiance direction, and a kernel size;

a step for estimating a light-reflectance value for the texel by: (i) applying an offset-prediction neural network to the coordinate and the incoming radiance direction to predict an offset coordinate of the texel; (ii) inputting the offset coordinate to a data structure to determine a reflectance feature vector of the texel at the kernel size; and (iii) applying a decoder neural network to the reflectance feature vector, the incoming radiance direction, and the outgoing radiance direction to estimate a light-reflectance value for the texel; and rendering, based on the light-reflectance value, the texel of the textured surface at the location, wherein the texel depicts at least part of the textured surface at an image scale that corresponds to the kernel size.

18. The non-transitory computer-readable storage medium of claim 17, wherein the data structure is a neural-texture pyramid, and wherein values of one or more latent variables of a reflectance feature vector are learned using a backpropagation algorithm.

19. The non-transitory computer-readable storage medium of claim 17, wherein applying the offset-prediction neural network to the coordinate and the incoming radiance direction further includes:

querying a neural-offset texture using the coordinate to identify an offset feature vector of the coordinate;

applying the offset-prediction neural network to the offset feature vector and the incoming radiance direction to estimate a ray depth associated with the coordinate; and applying an offset function to the ray depth to predict the offset coordinate.

20. The non-transitory computer-readable storage medium of claim 17, wherein the offset-prediction neural network is trained using an unsupervised training algorithm.

* * * * *